(12) United States Patent
Nagatoshi et al.

(10) Patent No.: US 11,320,635 B2
(45) Date of Patent: May 3, 2022

(54) IMAGING OPTICAL SYSTEM, PROJECTION TYPE DISPLAY DEVICE, AND IMAGING APPARATUS

(71) Applicant: FUJIFILM Corporation, Tokyo (JP)

(72) Inventors: Yukiko Nagatoshi, Saitama (JP); Akiko Nagahara, Saitama (JP); Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 98 days.

(21) Appl. No.: 16/998,541

(22) Filed: Aug. 20, 2020

(65) Prior Publication Data
US 2021/0063709 A1    Mar. 4, 2021

(30) Foreign Application Priority Data

Aug. 30, 2019  (JP) .............................. JP2019-158528

(51) Int. Cl.
| | | |
|---|---|---|
| G02B 3/00 | (2006.01) |
| G02B 13/16 | (2006.01) |
| G02B 17/08 | (2006.01) |
| G03B 21/28 | (2006.01) |
| G02B 13/22 | (2006.01) |
| G02B 27/00 | (2006.01) |

(52) U.S. Cl.
CPC ............. *G02B 13/16* (2013.01); *G02B 13/22* (2013.01); *G02B 17/0896* (2013.01); *G02B 27/0025* (2013.01); *G03B 21/28* (2013.01)

(58) Field of Classification Search
CPC .... G02B 13/16; G02B 13/22; G02B 17/0896; G02B 27/0025; G02B 27/149; G03B 21/28; G03B 21/14; H04N 9/3141
See application file for complete search history.

(56) References Cited

U.S. PATENT DOCUMENTS

| | | |
|---|---|---|
| 2015/0293434 A1 | 10/2015 | Matsuo |
| 2017/0332057 A1 | 11/2017 | Matsuo |
| 2017/0343776 A1* | 11/2017 | Nagatoshi .............. G02B 13/16 |

FOREIGN PATENT DOCUMENTS

| | | |
|---|---|---|
| JP | 2017-211477 A | 11/2017 |
| WO | 2014-103324 A1 | 7/2014 |
| WO | 2016-068269 A1 | 5/2016 |

* cited by examiner

*Primary Examiner* — James C. Jones
(74) *Attorney, Agent, or Firm* — Studebaker & Brackett PC

(57) ABSTRACT

The imaging optical system forms a first intermediate image at a position conjugate to a magnification side imaging surface and a second intermediate image at a position closer to a reduction side than the first intermediate image on an optical path and conjugate to the first intermediate image. The imaging optical system consists of a first optical system, a second optical system, and a third optical system in order from the magnification side to the reduction side along the optical path. The imaging optical system does not include a reflective member having a power.

19 Claims, 22 Drawing Sheets

EXAMPLE 1

EXAMPLE 1

MODIFICATION EXAMPLE 1-1

EXAMPLE 2

MODIFICATION EXAMPLE 2-1

EXAMPLE 3

MODIFICATION EXAMPLE 3-2

EXAMPLE 4

EXAMPLE 4

MODIFICATION EXAMPLE 4-1

IMAGING OPTICAL SYSTEM, PROJECTION TYPE DISPLAY DEVICE, AND IMAGING APPARATUS

CROSS-REFERENCE TO RELATED APPLICATIONS

The present application claims priority under 35 U.S.C. § 119 to Japanese Patent Application No. 2019-158528, filed on Aug. 30, 2019. The above application is hereby expressly incorporated by reference, in its entirety, into the present application.

BACKGROUND OF THE INVENTION

1. Field of the Invention

The technology of the present disclosure relates to an imaging optical system, a projection type display device, and an imaging apparatus.

2. Description of the Related Art

In the related art, a projection type display device that enlarges and projects an image, which is displayed on a light valve such as a liquid crystal display device or a digital micromirror device (DMD, registered trademark), on a screen or the like has been widely used. As optical systems applicable to a projection type display device, for example, the optical systems described in JP2017-211477A, WO2014/103324A, and WO2016/068269A are known.

JP2017-211477A discloses an imaging optical system capable of projecting an image displayed on an image display element disposed on a reduction side conjugate plane as an enlarged image on a magnification side conjugate plane. The imaging optical system substantially consists of a first optical system and a second optical system in order from the magnification side. The imaging optical system is configured such that the second optical system forms an image on the image display element as an intermediate image and the first optical system forms the magnification side intermediate image conjugate plane.

WO2014/103324A and WO2016/068269A disclose a system configured to perform projection from a first imaging surface on a reduction side to a second imaging surface on a magnification side so as to form two intermediate images and to include a reflective surface having a positive power at a position closer to the magnification side than the magnification side intermediate image of the two intermediate images.

SUMMARY OF THE INVENTION

Projection type display devices are required to have a wide angle of view, and in recent years, are also required to be able to support larger image display elements. The imaging optical system disclosed in JP2017-211477A has a configuration in which an intermediate image is formed only once. Therefore, in a case where the configuration is applied to a larger image display element, the diameter of the lens closest to the magnification side is large, which makes manufacturing difficult. In addition, the size of the device is increased.

In the systems of WO2014/103324A and WO2016/068269A, since a reflective surface having a power is disposed to be closer to the magnification side than the magnification side intermediate image, the rays near the optical axis cannot reach the screen and cannot be used for imaging That is, there is a disadvantage in that half or more of the image circle including the vicinity of the optical axis cannot be used.

The present disclosure has been made in view of the above circumstances, and has an object to provide an imaging optical system which is capable of using a wide area of an image circle including the vicinity of the optical axis and has favorable optical performance by keeping a lens diameter small while having a wide angle of view, a projection type display device including the imaging optical system, and an imaging apparatus including the imaging optical system.

According to an aspect of the technology of the present disclosure, there is provided an imaging optical system in which a magnification side imaging surface and a reduction side imaging surface are conjugate, in which the imaging optical system forms a first intermediate image at a position conjugate to the magnification side imaging surface and a second intermediate image at a position closer to a reduction side than the first intermediate image on an optical path and conjugate to the first intermediate image, in which the imaging optical system consists of a first optical system, a second optical system, and a third optical system in order from a magnification side to the reduction side along the optical path, in which magnification side surfaces of all lenses of the first optical system are located on the optical path to be closer to the magnification side than the first intermediate image, in which magnification side surfaces of all lenses of the second optical system are located on the optical path to be closer to the reduction side than the first intermediate image and to be closer to the magnification side than the second intermediate image, in which magnification side surfaces of all lenses of the third optical system are located on the optical path to be closer to the reduction side than the second intermediate image, and in which the imaging optical system does not include a reflective member having a power.

Assuming that a focal length of the first optical system is f1, a combined focal length of the first optical system and the second optical system is f12, and a focal length of the imaging optical system is f, it is preferable that the imaging optical system of the above aspect satisfies Conditional Expressions (1) and (2). Further, it is preferable that the imaging optical system of the above aspect satisfies Conditional Expressions (1) and (2) and also satisfies at least one of Conditional Expressions (1-1) or (2-1).

$$1<|f1/f|<5 \tag{1}$$

$$0.8<|f12/f|<3 \tag{2}$$

$$1.5<|f1/f|<3 \tag{1-1}$$

$$1<|f12/f|<2 \tag{2-1}$$

Assuming that a back focal length of the imaging optical system on the reduction side is Bf and a focal length of the imaging optical system is f, the imaging optical system of the above aspect preferably satisfies Conditional Expression (3), and more preferably satisfies Conditional Expression (3-1).

$$5<|Bf/f| \tag{3}$$

$$6<|Bf/f|<20 \tag{3-1}$$

Assuming that a maximum image height on the reduction side imaging surface is Ymax, and a focal length of the imaging optical system is f, the imaging optical system of the above aspect preferably satisfies Conditional Expression (4) and more preferably satisfies Conditional Expression (4-1).

$$1.9 < |Y\max/f| \quad (4)$$

$$2.1 < |Y\max/f| < 3.2 \quad (4\text{-}1)$$

In a case where a maximum image height on the reduction side imaging surface is Ymax and a ray is incident from the reduction side imaging surface to the imaging optical system at a height of Ymax from an optical axis in parallel with an optical axis, assuming that an air gap in which the first intermediate image is located is a first air gap in a case where the first intermediate image is located inside the air gap, and an air gap which is adjacent to the magnification side of a lens in which the first intermediate image is located is the first air gap in a case where the first intermediate image is located inside the lens, an angle formed between a first extension line obtained by extending the ray in the first air gap and the optical axis is θ, and a sign of θ is negative in a case where a first intersection point, which is an intersection point between a first extension line and the optical axis, is located to be closer to the magnification side than the first intermediate image, and the sign of θ is positive in a case where the first intersection point is located to be closer to the reduction side than the first intermediate image, where a unit of θ is degrees, the imaging optical system of the above aspect preferably satisfies Conditional Expression (5) and more preferably satisfies Conditional Expression (5-1).

$$-15 < \theta < 15 \quad (5)$$

$$-13 < \theta < 13 \quad (5\text{-}1)$$

In a case where a maximum image height on the reduction side imaging surface is Ymax and a ray is incident from the reduction side imaging surface to the imaging optical system at a height of Ymax from an optical axis in parallel with an optical axis, assuming that a height of the ray from the optical axis on a lens surface closest to the magnification side in the second optical system is h1, an air gap in which the first intermediate image is located is a first air gap in a case where the first intermediate image is located inside the air gap, and an air gap which is adjacent to the magnification side of a lens in which the first intermediate image is located is the first air gap in a case where the first intermediate image is located inside the lens, an intersection point between a first extension line obtained by extending the ray in the first air gap and the optical axis is a first intersection point, a distance on the optical axis between the first intersection point and the lens surface closest to the magnification side in the second optical system is dd1, a height of the ray from the optical axis on a lens surface closest to the magnification side in the third optical system is h2, an air gap in which the second intermediate image is located is a second air gap in a case where the second intermediate image is located inside the air gap, and an air gap which is adjacent to the magnification side of a lens in which the second intermediate image is located is the second air gap in a case where the second intermediate image is located inside the lens, an intersection point between a second extension line obtained by extending the ray in the second air gap and the optical axis is a second intersection point, a distance on the optical axis between the second intersection point and the lens surface closest to the magnification side in the third optical system is dd2, and a larger value of |h1/dd1| and |h2/dd2| is hdA and a smaller value of |h1/dd1| and |h2/dd2| is hdB, it is preferable that the imaging optical system of the above aspect satisfies Conditional Expressions (6) and (7).

$$0.1 < hdA < 1 \quad (6)$$

$$0.03 < hdB < 0.3 \quad (7)$$

In a case where an absolute value of a height of a principal ray having a maximum angle of view from an optical axis is the maximum on a lens surface closest to the magnification side in the first optical system, assuming that a distance on the optical axis from the lens surface closest to the magnification side to a lens surface closest to the reduction side is TL, a maximum image height on the reduction side imaging surface is Ymax, a height of the principal ray with the maximum angle of view from the optical axis on the lens surface closest to the magnification side is h, and a focal length of the imaging optical system is f, the imaging optical system of the above aspect preferably satisfies Conditional Expression (8), and more preferably satisfies Conditional Expression (8-1).

$$20 < (TL \times Y\max)/(|h| \times |f|) < 60 \quad (8)$$

$$30 < (TL \times Y\max)/(|h| \times |f|) < 50 \quad (8\text{-}1)$$

Assuming that a focal length of the first optical system is f1, a maximum image height on the reduction side imaging surface is Ymax, a height of the principal ray with the maximum angle of view from the optical axis on the lens surface closest to the magnification side is h, and a focal length of the imaging optical system is f, the imaging optical system of the above aspect preferably satisfies Conditional Expression (9), and more preferably satisfies Conditional Expression (9-1).

$$1.2 < (f1 \times Y\max^2)/(|h| \times f^2) < 4 \quad (9)$$

$$1.5 < (f1 \times Y\max^2)/(|h| \times f^2) < 3 \quad (9\text{-}1)$$

It is preferable that all optical elements included in the imaging optical system of the above aspect have a common optical axis.

The imaging optical system of the above aspect may be configured to include two or more optical path deflecting members that deflect the optical path.

According to another aspect of the technology of the present disclosure, there is provided a projection type display device comprising: a light valve that outputs an optical image; and the imaging optical system according to the above aspect, in which the imaging optical system projects the optical image, which is output from the light valve, on a screen.

According to still another aspect of the technology of the present disclosure, there is provided an imaging apparatus comprising the imaging optical system according to the above aspect.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

The sign of the power and the surface shape of the lens including the aspheric surface will be considered in terms of the paraxial region unless otherwise specified. The "focal length" used in the conditional expression is a paraxial focal length. The values used in Conditional Expressions are values in a case where the d line is used as a reference in a state where the object at infinity is in focus unless otherwise specified. The term "image circle" described herein means a maximum effective image circle. The "d line", "C line", and "F line" described herein are bright lines, the wavelength of the d line is 587.56 nm (nanometers), the wavelength of the C line is 656.27 nm (nanometers), and the wavelength of the F line is 486.13 nm (nanometers).

According to the technology of the present disclosure, it is possible to provide an imaging optical system which is capable of using a wide area of an image circle including the vicinity of the optical axis and has favorable optical performance by keeping a lens diameter small while having a wide angle of view, a projection type display device including the imaging optical system, and an imaging apparatus including the imaging optical system.

DESCRIPTION OF THE PREFERRED EMBODIMENTS

Figure 1:
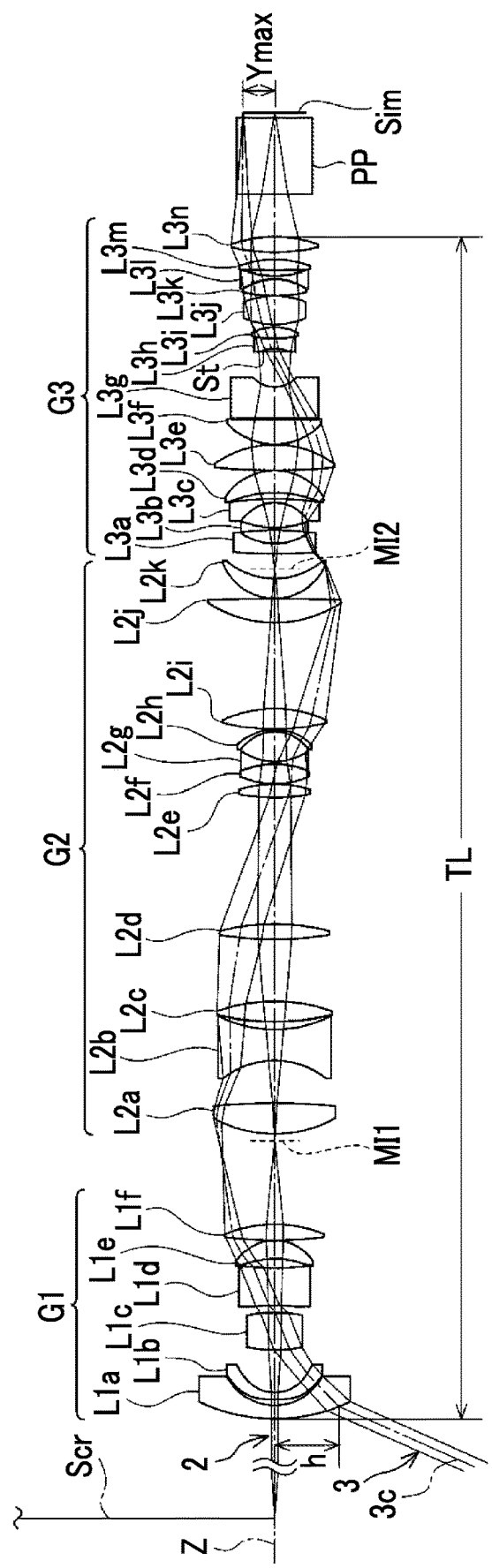
FIG. 1 is a cross-sectional view showing a configuration and rays of an imaging optical system according to an example of an embodiment relating to the technology of the present disclosure corresponding to an imaging optical system of Example 1 of the present disclosure.

Hereinafter, an example of an embodiment according to the technology of the present disclosure will be described in detail with reference to the drawings. FIG. 1 shows a configuration in a cross section including an optical axis Z of an imaging optical system according to an embodiment of the present disclosure. The configuration example shown in FIG. 1 corresponds to Example 1 described later. In FIG. 1, the left side is the magnification side and the right side is the reduction side, and the on-axis rays 2 and the rays 3 with the maximum angle of view are also shown.

The imaging optical system according to the technology of the present disclosure may be a projection optical system mounted on a projection type display device, or may be an imaging optical system mounted on a digital camera or the like. Hereinafter, the imaging optical system according to the technology of the present disclosure in a case where the imaging optical system is used for a projection optical system will be described.

FIG. 1 shows an example in which an optical member PP is disposed on the reduction side of the imaging optical system, under the assumption that the imaging optical system is mounted on a projection type display device. The optical member PP is a member such as various filters, a cover glass, a color synthesis prism, or the like. The optical member PP is a member having no power, and a configuration in which the optical member PP is omitted is also possible.

FIG. 1 also shows a screen Scr and an image display surface Sim of a light valve, under the assumption that the imaging optical system is mounted on the projection type display device. In the projection type display device, rays provided with image information on the image display surface Sim are incident on the imaging optical system through the optical member PP, and are projected on the screen Scr through the imaging optical system. In the following description, the "magnification side" means the screen Scr side, and the "reduction side" means the image display surface Sim side. The screen Scr is an example of the "magnification side imaging surface" of the present disclosure, and the image display surface Sim is an example of the "reduction side imaging surface" of the present disclosure. The imaging optical system has an effect of making the magnification side imaging surface and the reduction side imaging surface conjugate.

The imaging optical system consists of, in order from the magnification side to the reduction side along the optical path, a first optical system G1, a second optical system G2, and a third optical system G3. As an example, in the imaging optical system of FIG. 1, the first optical system G1 consists of lenses L1a to L1f in order from the magnification side to the reduction side, the second optical system G2 consists of the lenses L2a to L2k in order from the magnification side to the reduction side, and the third optical system G3 consists of lenses L3a to L3g, an aperture stop St, and lenses L3h to L3n in order from the magnification side to the reduction side.

The imaging optical system is a relay type optical system, and forms a first intermediate image MI1 at a position conjugate to the magnification side imaging surface and a second intermediate image MI2 at a position closer to a reduction side than the first intermediate image MI1 on an optical path and conjugate to the first intermediate image MI1. That is, the magnification side imaging surface, the first intermediate image MI1, the second intermediate image MI2, and the reduction side imaging surface are all located to be conjugate.

The magnification side surfaces of all lenses of the first optical system G1 are located on the optical path to be closer to the magnification side than the first intermediate image MI1. The magnification side surfaces of all lenses of the second optical system G2 are located on the optical path to be closer to the reduction side than the first intermediate image MI1 and to be closer to the magnification side than the second intermediate image MI2. The magnification side surfaces of all lenses of the third optical system G3 are located on the optical path to be closer to the reduction side than the second intermediate image MI2. That is, whether a certain lens is included in the first optical system G1 or the second optical system G2 is determined by the positional relationship between the magnification side surface of the lens and the first intermediate image MI1. Therefore, in a case where the first intermediate image MI1 is located inside a certain lens, the lens is included in the first optical system G1 instead of the second optical system G2. However, the positional relationship between the magnification side surface of each lens and each intermediate image is on the optical axis. For example, "the magnification side surfaces of all the lenses are located on the optical path to be closer to the magnification side than the first intermediate image MI1" in the first optical system G1 means that the magnification side surfaces of all the lenses of the first optical system G1 on the optical axis is located on the optical path to be closer to the magnification side than the position of the first intermediate image MI1 on the optical axis. The same configuration applies to the second optical system G2 and the third optical system G3. In addition, as for the cemented lens, it is preferable that all the lenses in one cemented lens are included in the same optical system. Therefore, assuming that the surface closest to the magnification side in the cemented lens is the "magnification side surface", the "position" is considered.

In the example of FIG. 1, the first intermediate image MI1 is formed between the first optical system G1 and the second optical system G2, and the second intermediate image MI2 is formed between the second optical system G2 and the third optical system G3. In the first intermediate image MI1 and the second intermediate image MI2 shown in FIG. 1, only a part including the vicinity of the optical axis is simply indicated by a dotted line such that the position on the optical axis of each intermediate image can be understood. Thus, the images do not represent actual shapes.

The system for forming an intermediate image is able to suppress an increase in the diameter of the magnification side lens while ensuring a wide angle of view, and thus is suitable for use in a projection type display device requiring a wide angle of view. In particular, as compared with a system in which an intermediate image is formed only once, in a system in which an intermediate image is formed twice, it is easier to reduce the diameter of the magnification side lens while ensuring a wide angle of view. In addition, the number of locations where the rays separates at each image height increases. Thus, there is an advantage in correcting off-axis aberrations. Therefore, an imaging optical system that forms an intermediate image twice has a wide angle of view and a large image circle while reducing the diameter of the magnification side lens. Thus, there is an advantage in realizing the optical system in which the distortion and the field curvature are satisfactorily corrected.

Figure 2:
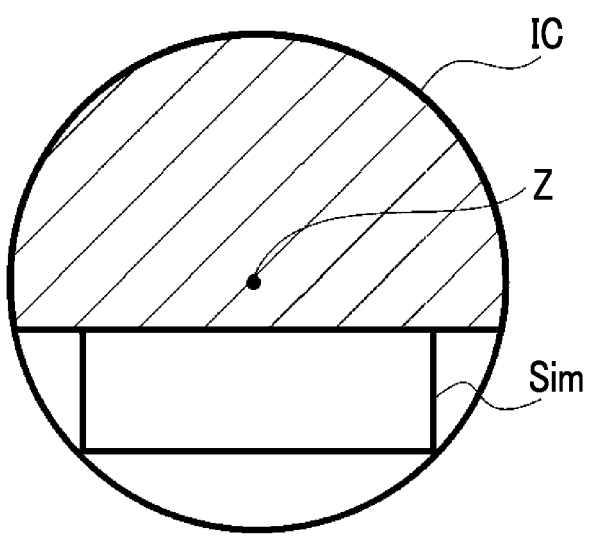
FIG. 2 is a diagram showing an available area and an unavailable area of an image circle in a system including a reflective member having a power, as a comparative example.

Further, the imaging optical system according to the technology of the present disclosure is configured not to include a reflective member having a power, and therefore, rays near the optical axis can be used for forming an image on the screen Scr. This will be described with reference to a comparative example shown in FIG. 2. FIG. 2 is a diagram showing an available area and an unavailable area in a case where an image display surface Sim is disposed in an image circle in a system including a reflective surface having power as described in WO2014/103324A. In a system including a reflective surface having power, rays near the optical axis Z cannot be used. Therefore, as indicated by a hatched portion in FIG. 2, half or more of the image circle IC is an unavailable area in which the image display surface Sim cannot be disposed. In this system, the image display surface Sim can be disposed only in the area indicated by the outline in FIG. 2, and only a small area less than half of the image circle IC can be used.

On the other hand, since the imaging optical system according to the technology of the present disclosure does not include a reflective member having a power, rays near the optical axis can also be used, and half or more of the image circle including the optical axis portion can be used. The imaging optical system in FIG. 1 is able to use the rays in the entire area of the image circle, and the entire area of the image circle is an area which can be used for the image display surface Sim to be disposed therein. Since the imaging optical system according to the technology of the present disclosure has such a high degree of design freedom, the imaging optical system is also suitable for not only a configuration in which the center of the image display surface Sim is on the optical axis, but also a configuration in which the center of the image display surface Sim is disposed to be deviated from the optical axis Z.

Next, a preferred configuration of the imaging optical system according to the technology of the present disclosure will be described. In the imaging optical system, assuming that a focal length of the first optical system G1 is f1 and a focal length of the imaging optical system is f, it is preferable that Conditional Expression (1) is satisfied. Conditional Expression (1) is an expression relating to the relay magnification of the first intermediate image MI1. By not allowing the result of Conditional Expression (1) to be equal to or less than the lower limit, it is easy to correct spherical aberration, field curvature, and astigmatism. By not allowing the result of Conditional Expression (1) to be equal to or greater than the upper limit, it is easy to reduce the diameter of the lens near the first intermediate image MI1. Further, in a case of the configuration satisfying Conditional Expression (1-1), more favorable characteristics can be obtained.

$$1 < |f1/f| < 5 \tag{1}$$

$$1.5 < |f1/f| < 3 \tag{1-1}$$

Further, in the imaging optical system, assuming that a combined focal length of the first optical system G1 and the second optical system G2 is f12 and a focal length of the imaging optical system is f, it is preferable that Conditional Expression (2) is satisfied. Conditional Expression (2) is an expression relating to the relay magnification of the second intermediate image MI2. By not allowing the result of Conditional Expression (2) to be equal to or less than the lower limit, it is easy to correct spherical aberration, field curvature, and astigmatism. By not allowing the result of Conditional Expression (2) to be equal to or greater than the upper limit, it is easy to reduce the diameter of the lens near the second intermediate image MI2. Further, in a case of the configuration satisfying Conditional Expression (2-1), more favorable characteristics can be obtained.

$$0.8<|f12/f|<3 \quad (2)$$

$$1<|f12/f|<2 \quad (2-1)$$

It is preferable that the imaging optical system satisfies Conditional Expressions (1) and (2). Further, it is preferable to satisfy not only Conditional Expressions (1) and (2) but also at least one of Conditional Expressions (1-1) or (2-1).

In the imaging optical system, assuming that a back focal length of the imaging optical system on the reduction side is Bf and a focal length of the imaging optical system is f, it is preferable that Conditional Expression (3) is satisfied. The "back focal length on the reduction side" is an air-equivalent distance on the optical axis from the lens surface closest to the reduction side to the focal position on the reduction side of the imaging optical system. By not allowing the result of Conditional Expression (3) to be equal to or less than the lower limit, it is possible to ensure a sufficient back focal length for inserting a color synthesis prism or the like used in the projection type display device. Further, it is preferable to satisfy Conditional Expressions (3-1). By not allowing the result of Conditional Expression (3-1) to be equal to or less than the lower limit, a longer back focal length can be ensured. By not allowing the result of Conditional Expression (3-1) to be equal to or greater than the upper limit, magnification of the optical system can be suppressed.

$$5<|Bf/f| \quad (3)$$

$$6<|Bf/f|<20 \quad (3-1)$$

In the imaging optical system, assuming that the maximum image height on the reduction side imaging surface is Ymax and the focal length of the imaging optical system is f, it is preferable that Conditional Expression (4) is satisfied. By not allowing the result of Conditional Expression (4) to be equal to or less than the lower limit, there is an advantage in ensuring a wide angle of view. Further, it is preferable to satisfy Conditional Expressions (4-1). By not allowing the result of Conditional Expression (4-1) to be equal to or less than the lower limit, there is an advantage in ensuring a wider angle of view. By not allowing the result of Conditional Expression (4-1) to be equal to or greater than the upper limit, it is easy to perform aberration correction while suppressing an increase in the diameter of the lens of the first optical system G1.

$$1.9<|Ymax/f| \quad (4)$$

$$2.1<|Ymax/f|<3.2 \quad (4-1)$$

Figure 3:
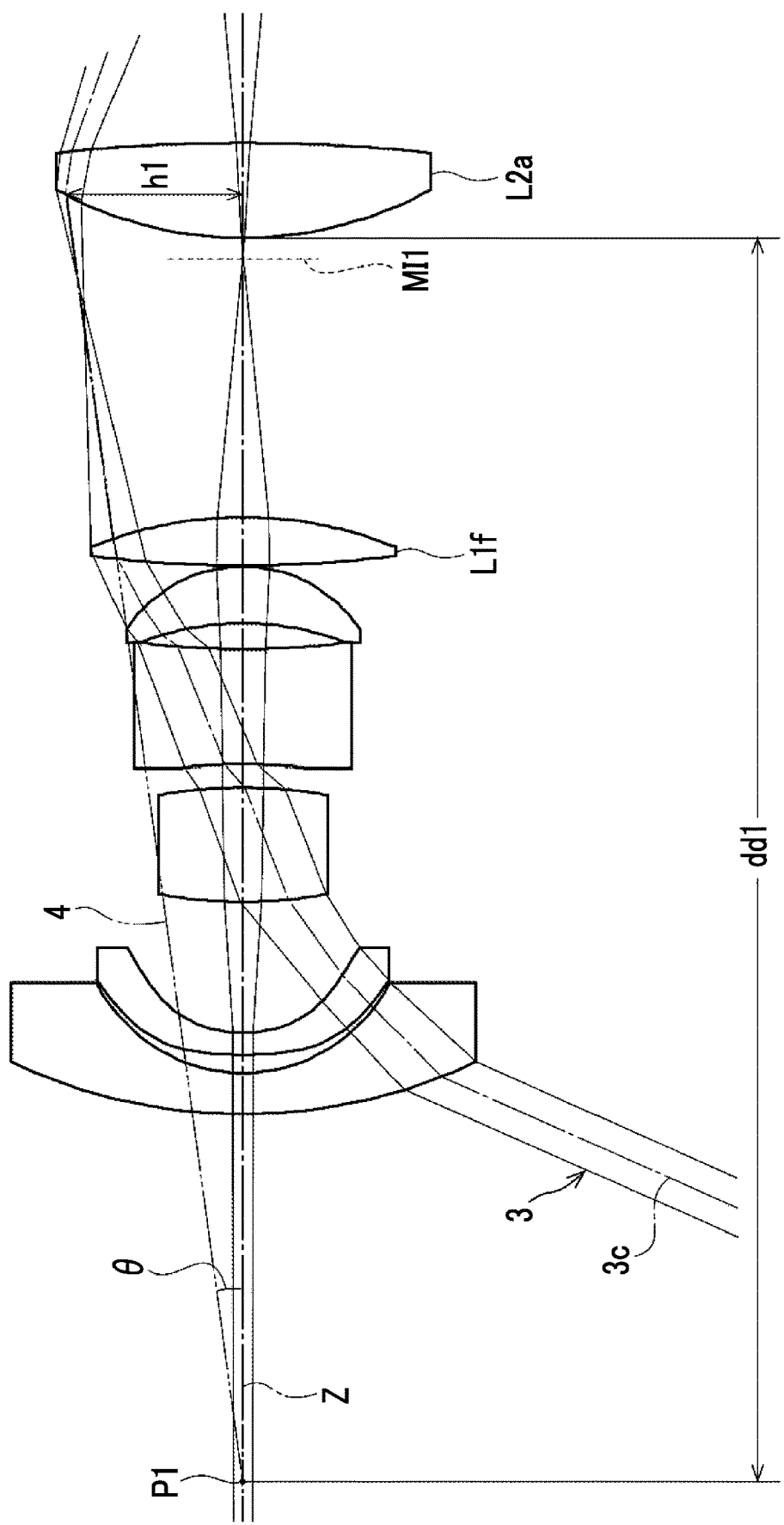
FIG. 3 is an enlarged view of a main part showing an example of a symbol in a conditional expression.

In the imaging optical system, assuming that the maximum image height on the reduction side imaging surface is Ymax and the ray 3c is incident from the reduction side imaging surface to the imaging optical system, at a height of Ymax from the optical axis Z, in parallel with the optical axis Z, it is preferable that θ described below satisfies Conditional Expression (5). FIG. 3 in which the imaging optical system of FIG. 1 is partially enlarged shows an example of θ. θ is defined as follows. The air gap in which the first intermediate image MI1 is located is a first air gap. An angle formed between a first extension line 4 shown by a two-dot chain line in FIG. 3 obtained by extending the ray 3c within the first air gap and the optical axis Z is θ. The unit of θ is degrees. The sign of θ is negative in a case where the first intersection point P1, which is the intersection point of the first extension line 4 and the optical axis Z, is located to be closer to the magnification side than the first intermediate image MI1 and is positive in a case where the first intersection point P1 is located to be closer to the reduction side than the first intermediate image MI1. In the example of FIG. 3, the first air gap is between the lens L1f and the lens L2a. In FIG. 3, reference numerals of some lenses are omitted to avoid complication of the drawing. It should be noted that the position of the first intermediate image MI1 used here is the position of the first intermediate image MI1 on the optical axis. Further, unlike the example of FIG. 3, in a case where the first intermediate image MI1 is located inside the lens or on the surface of the lens, the air gap adjacent to the magnification side of the lens where the first intermediate image MI1 is located is the first air gap.

$$-15<\theta<15 \quad (5)$$

$$-13<\theta<13 \quad (5-1)$$

$$-10<\theta<10 \quad (5-2)$$

By not allowing the result of Conditional Expression (5) to be equal to or less than the lower limit, the first intermediate image MI1 is prevented from becoming excessively small, that is, the relay magnification of the optical system in which the second optical system G2 and the third optical system G3 are combined is prevented from becoming excessively small. Thus, it is possible to reduce the load on the magnification and performance of the first optical system G1 while ensuring the magnification of the entire imaging optical system. As a result, the aberration correction in the first optical system G1 is easy. If the aberration and the performance burden of the first optical system G1 are large and the aberration is intended to be satisfactorily corrected, the total length of the first optical system G1 is long, or the distance from the lens surface closest to the magnification side in the first optical system G1 to the magnification side pupil position of the first optical system G1 is long. As a result, the magnification side lens is large in diameter. By not allowing the result of Conditional Expression (5) to be equal to or greater than the upper limit, the first intermediate image MI1 is prevented from becoming excessively large. Thus, the positive power given to the first optical system G1 for the convergence of the ray may can be prevented from becoming excessively strong. In addition, there is an advantage in obtaining a wide angle of view while suppressing an increase in the diameter of the lens closer to the magnification side than the first intermediate image MI1. Further, in a case of the configuration satisfying Conditional Expression (5-1), more favorable characteristics can be obtained. In a case of the configuration satisfying Conditional Expression (5-2), more favorable characteristics can be obtained.

It is preferable that the imaging optical system satisfies Conditional Expressions (4) and (5). Further, it is preferable to satisfy not only Conditional Expressions (4) and (5) but also at least one of Conditional Expressions (4-1), (5-1), or (5-2).

Further, in the imaging optical system, assuming that the maximum image height on the reduction side imaging surface is Ymax and the ray 3c is incident from the reduction side imaging surface to the imaging optical system, at a height of Ymax from the optical axis Z, in parallel with the optical axis Z, it is preferable that |h1/dd1| described below satisfies Conditional Expression (10). FIG. 3 shows an example of h1 and dd1. h1 and dd1 are defined as follows. The height of the ray 3c from the optical axis Z on the lens surface closest to the magnification side in the second optical system G2 is h1. The distance on the optical axis between the first intersection point P1 defined in the description of Conditional Expression (5) and the lens surface of the second optical system G2 closest to the magnification side is dd1.

$$0.03 < |h1/dd1| < 1 \tag{10}$$

$$0.03 < |h1/dd1| < 0.85 \tag{10-1}$$

$$0.1 < |h1/dd1| < 0.85 \tag{10-2}$$

By not allowing the result of Conditional Expression (10) to be equal to or less than the lower limit, a tilt angle of the ray 3c near the first intermediate image MI1 with respect to the optical axis Z is prevented from becoming excessively small. As a result, an increase in the diameter of the lens near the first intermediate image MI1 can be suppressed. By not allowing the result of Conditional Expression (10) to be equal to or greater than the upper limit, the relay magnification of the optical system in which the second optical system G2 and the third optical system G3 are combined is prevented from becoming excessively small. Thus, it is possible to reduce the load on the magnification and performance of the first optical system G1 while ensuring the magnification of the entire imaging optical system. As a result, it is easy to perform the aberration correction in the first optical system G1. If aberrations are intended to be satisfactorily corrected in a case where the magnification of the first optical system G1 increases, the diameter of the lens increases. Further, in a case of the configuration satisfying Conditional Expression (10-1), more favorable characteristics can be obtained. In a case of the configuration satisfying Conditional Expression (10-2), more favorable characteristics can be obtained.

Figure 4:
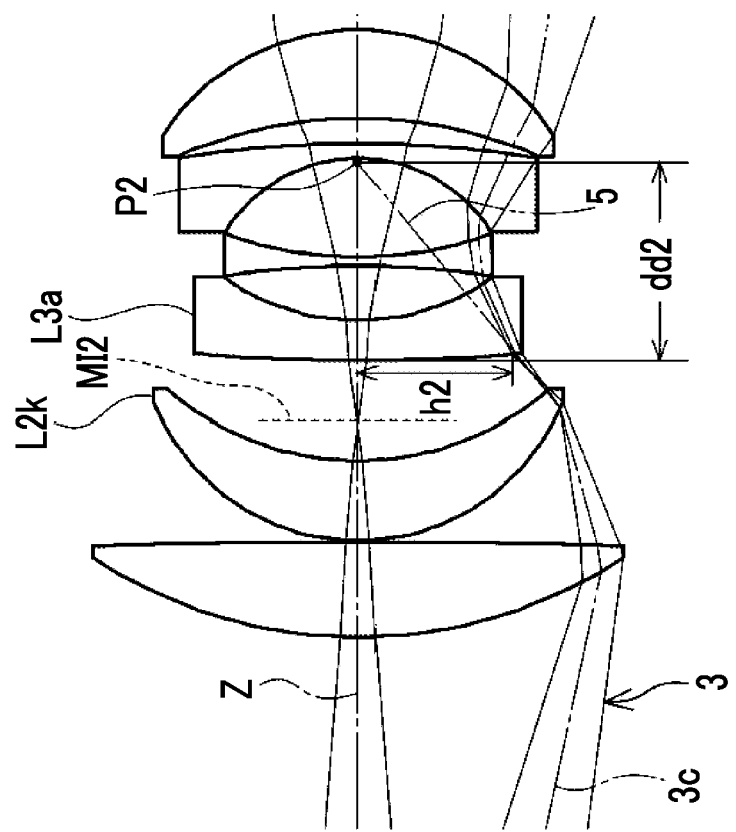
FIG. 4 is an enlarged view of a main part showing an example of a symbol in a conditional expression.

Further, in the imaging optical system, assuming that the maximum image height on the reduction side imaging surface is Ymax and the ray 3c is incident from the reduction side imaging surface to the imaging optical system, at a height of Ymax from the optical axis Z, in parallel with the optical axis Z, it is preferable that |h2/dd2| described below satisfies Conditional Expression (11). FIG. 4 in which the imaging optical system of FIG. 1 is partially enlarged shows an example of h2 and dd2. h2 and dd2 are defined as follows. The height of the ray 3c from the optical axis Z on the lens surface closest to the magnification side in the third optical system G3 is h2. The air gap in which the second intermediate image MI2 is located is a second air gap. The intersection point of the second extension line 5 shown by a two-dot chain line in FIG. 4 obtained by extending the ray 3c within the second air gap and the optical axis Z is a second intersection point P2. The distance on the optical axis between the second intersection point P2 and the lens surface of the third optical system G3 closest to the magnification side is dd2. In the example of FIG. 4, the distance between the lens L2k and the lens L3a is the second air gap. In FIG. 4, reference numerals of some lenses are omitted to avoid complication of the drawing. It should be noted that the position of the second intermediate image MI2 used here is the position of the second intermediate image MI2 on the optical axis. Further, unlike the example of FIG. 4, in a case where the second intermediate image MI2 is located inside the lens or on the surface of the lens, the air gap adjacent to the magnification side of the lens where the second intermediate image MI2 is located is the second air gap.

$$0.03 < |h2/dd2| < 1 \tag{11}$$

$$0.03 < |h2/dd2| < 0.85 \tag{11-1}$$

$$0.1 < |h2/dd2| < 0.85 \tag{11-2}$$

By not allowing the result of Conditional Expression (11) to be equal to or less than the lower limit, a tilt angle of the ray 3c near the second intermediate image MI2 with respect to the optical axis Z is prevented from becoming excessively small. As a result, an increase in the diameter of the lens near the second intermediate image MI2 can be suppressed. By not allowing the result of Conditional Expression (11) to be equal to or greater than the upper limit, the relay magnification of the third optical system G3 is prevented from becoming excessively small Thus, it is possible to reduce the load on the magnification and performance of the optical system closer to the magnification side than the second intermediate image MI2 while ensuring the magnification of the entire imaging optical system. As a result, it is easy to perform the aberration correction in the optical system. If aberrations are intended to be satisfactorily corrected in a case where the magnification of the optical system closer to the magnification side than the second intermediate image MI2 increases, the diameter of the lens increases. Further, in a case of the configuration satisfying Conditional Expression (11-1), more favorable characteristics can be obtained. In a case of the configuration satisfying Conditional Expression (11-2), more favorable characteristics can be obtained.

It is preferable that the imaging optical system satisfies Conditional Expressions (10) and (11). Further, it is preferable to satisfy not only Conditional Expressions (10) and (11) but also at least one of Conditional Expressions (10-1), (10-2), (11-1), or (11-2).

In the imaging optical system, assuming that the larger one of |h1/dd1| and |h2/dd2| is hdA and the smaller one is hdB, it is preferable that Conditional Expressions (6) and (7) are satisfied. In the examples shown in FIGS. 3 and 4, since |h1/dd1|=0.16 and |h2/dd2|=0.813, hdA=|h2/dd2| and hdB=|h1/dd1|.

$$0.1 < hdA < 1 \tag{6}$$

$$0.1 < hdA < 0.85 \tag{6-1}$$

$$0.03 < hdB < 0.3 \tag{7}$$

$$0.1 < hdB < 0.3 \tag{7-1}$$

In the case where hdA=|h2/dd2| and hdB=|h1/dd1|, by not allowing the result of Conditional Expression (6) to be equal to or less than the lower limit, a tilt angle of the ray 3c near the second intermediate image MI2 with respect to the optical axis Z is prevented from becoming excessively small. As a result, an increase in the diameter of the lens near the second intermediate image MI2 can be suppressed. By not allowing the result of Conditional Expression (6) to be equal to or greater than the upper limit, the relay magnification of the third optical system G3 is prevented from becoming excessively small. Thus, it is possible to reduce the load on the magnification and performance of the optical system closer to the magnification side than the second intermediate image MI2 while ensuring the magnification of the entire imaging optical system. As a result, it is easy to perform the aberration correction in the optical system. If aberrations are intended to be satisfactorily corrected in a case where the magnification of the optical system closer to the magnification side than the second intermediate image MI2 increases, the diameter of the lens increases. Further, in a case of the configuration satisfying Conditional Expression (6-1), more favorable characteristics can be obtained.

In the case where hdA=|h2/dd2| and hdB=|h1/dd1|, by not allowing the result of Conditional Expression (7) to be equal to or less than the lower limit, a tilt angle of the ray 3c near the first intermediate image MI1 with respect to the optical axis Z is prevented from becoming excessively small. As a result, an increase in the diameter of the lens near the first intermediate image MI1 can be suppressed. By not allowing the result of Conditional Expression (7) to be equal to or greater than the upper limit, the relay magnification of the optical system in which the second optical system G2 and the third optical system G3 are combined is prevented from becoming excessively small. Thus, it is possible to reduce the load on the magnification and performance of the optical system closer to the magnification side than the first intermediate image MI1 while ensuring the magnification of the entire imaging optical system. As a result, it is easy to perform the aberration correction in the optical system. If aberrations are intended to be satisfactorily corrected in a case where the magnification of the optical system closer to the magnification side than the first intermediate image MI1 increases, the diameter of the lens increases. Further, in a case of the configuration satisfying Conditional Expression (7-1), more favorable characteristics can be obtained. In a case where hdA=|h1/dd1| and hdB=|h2/dd2|, the effect of Conditional Expression (6) and the effect of Conditional Expression (7) are replaced.

It is preferable that the imaging optical system is configured to be telecentric on the reduction side. In a projection type display device, spectral characteristics of a color synthesis prism disposed between an imaging optical system and a light valve change depending on an angle of incident ray. It is desired that the imaging optical system used in combination with the member having the incident angle dependency is configured to be telecentric on the reduction side. Here, the term "telecentric" is not limited to a case where the inclination of the principal ray with respect to the optical axis Z is 0 degree, and an error of ±3 degrees is allowed. In the imaging optical system of FIG. 1, the imaging optical system is configured to be telecentric on the reduction side, and the ray 3c used in the above description corresponds to the principal ray with the maximum angle of view. In addition, unlike the example of FIG. 1, in a system that does not include an aperture stop, in a case where rays are viewed in a direction from the magnification side to the reduction side, the telecentricity may be determined by using, as a substitute for the principal ray, the bisector of the highest ray on the upper side and the lowest ray on the lower side in the cross section of the rays condensed at an optional point on the image display surface Sim that is the reduction side imaging surface.

In the imaging optical system, it is preferable that an absolute value of a height of the principal ray with the maximum angle of view from the optical axis Z is the maximum on a lens surface closest to the magnification side in the first optical system G1. In addition to this configuration, assuming that a distance on the optical axis from the lens surface closest to the magnification side to the lens surface closest to the reduction side is TL, a maximum image height on the reduction side imaging surface is Ymax, a height of the principal ray with the maximum angle of view from the optical axis Z on the lens surface closest to the magnification side is h, and a focal length of the imaging optical system is f, it is preferable that the imaging optical system satisfies Conditional Expression (8). By not allowing the result of Conditional Expression (8) to be equal to or less than the lower limit, there is an advantage in suppressing an increase in the diameter of the magnification side lens. By not allowing the result of Conditional Expression (8) to be equal to or greater than the upper limit, there is an advantage in performing favorable aberration correction, particularly correction of distortion and astigmatism while obtaining a wide angle of view. Further, in a case of the configuration satisfying Conditional Expression (8-1), more favorable characteristics can be obtained.

$$20 < (TL \times Y\max)/(|h| \times |f|) < 60 \tag{8}$$

$$30 < (TL \times Y\max)/(|h| \times |f|) < 50 \tag{8-1}$$

In the imaging optical system, assuming that a focal length of the first optical system G1 is f1, a maximum image height on the reduction side imaging surface is Ymax, a height of the principal ray with the maximum angle of view from the optical axis Z on the lens surface closest to the magnification side is h, and a focal length of the imaging optical system is f, it is preferable to satisfy Conditional Expression (9). By not allowing the result of Conditional Expression (9) to be equal to or less than the lower limit, there is an advantage in suppressing an increase in the diameter of the magnification side lens. By not allowing the result of Conditional Expression (9) to be equal to or greater than the upper limit, there is an advantage in performing favorable aberration correction, particularly correction of distortion and astigmatism while obtaining a wide angle of view. Further, in a case of the configuration satisfying Conditional Expression (9-1), more favorable characteristics can be obtained.

$$1.2 < (f1 \times Y\max^2)/(|h| \times f^2) < 4 \tag{9}$$

$$1.5 < (f1 \times Y\max^2)/(|h| \times f^2) < 3 \tag{9-1}$$

It is preferable that all the optical elements included in the imaging optical system have the common optical axis Z. In this case, there is an advantage in making the entire area of the image circle available, and the cost can be reduced since the structure can be simplified.

Each optical system in the imaging optical system can be configured, for example, as follows. The first optical system G1 may be configured to comprise a negative meniscus lens closest to the magnification side. In such a case, there is an advantage in increasing the angle of view. The first optical system G1 may be configured to comprise a plurality of negative meniscus lenses successively in order from the most magnification side. In such a case, there is an advantage in increasing the angle of view. The lens closest to the reduction side in the first optical system G1 may be a positive lens. In such a case, there is an advantage in reducing the diameter of the lens. The lens closest to the magnification side in the second optical system G2 may be a positive lens. In such a case, there is an advantage in reducing the diameter of the lens. The lens surface closest to the magnification side in the second optical system G2 may be a convex surface. In such a case, there is an advantage in reducing the diameter of the lens. The lens closest to the reduction side in the third optical system G3 may be a positive lens. In such a case, there is an advantage in making the optical system telecentric on the reduction side.

The number of lenses included in each optical system may be different from the number shown in FIG. 1. All the optical elements having powers included in the imaging optical system may be configured as lenses. All lenses included in the imaging optical system preferably have a refractive index of 2.2 or less at the d line, and more preferably 2 or less in consideration of the availability of current lens materials. The imaging optical system may be configured to include a diffractive optical surface. In a case where a diffractive optical surface is provided on a surface of a certain lens, the technology of the present disclosure can be applied by regarding the diffractive optical surface as a lens surface for convenience. The imaging optical system preferably has a total angle of view greater than 120 degrees, more preferably greater than 125 degrees, and even more preferably greater than 130 degrees. The imaging optical system preferably has an F number of 3 or less. In the imaging optical system, it is preferable that distortion is suppressed within a range of −2% or more and +2% or less.

FIG. 1 shows an example of an imaging optical system having a straight optical path, but the present disclosure is not limited to this. The imaging optical system may be provided with an optical path deflecting member that deflects the optical path so as to deflect the optical path. As the optical path deflecting member, for example, a member having a reflective surface such as a mirror can be used. By deflecting the optical path, a configuration advantageous for miniaturization can be obtained. For example, as in the imaging optical system shown in FIG. 6 to be described later as a modification example, there may be provided a first optical path deflecting member R1 that deflects the optical path by 90 degrees and a second optical path deflecting member R2 that deflects the optical path by 90 degrees. Thereby, the optical path may be configured to be deflected twice. The angle at which the optical path is deflected is not limited to strict 90 degrees, and may be an angle including an error of ±3 degrees, for example. It is preferable that the angle of deflection is 90 degrees since the structure is simple in terms of assembling and manufacturing, but the angle is not necessarily 90 degrees.

As a location where the optical path deflecting member is disposed, it is preferable to select an air gap formed such that the distance on the optical axis between two lens surfaces adjacent to the optical path deflecting member on the magnification side and the reduction side of the optical path deflecting member is a length equal to or greater than 60% of the effective diameter of the larger of the effective diameters of these two lens surfaces. By disposing the optical path deflecting member at such a location, it is possible to deflect the optical path in a state where half or more of the area including the vicinity of the optical axis in the image circle can be used. As a result, it is possible to improve compactness and installability of the apparatus. More preferably, the optical path deflecting member is disposed in the air gap which is formed such that the distance on the optical axis between two lens surfaces adjacent to the optical path deflecting member on the magnification side and the reduction side of the optical path deflecting member is longer than the larger effective diameter of the effective diameters of these two lens surfaces. By disposing the optical path deflecting member at such a location, the optical path can be deflected while keeping the state where the entire area of the image circle can be used. As a result, it is possible to further improve compactness and installability of the apparatus.

In a case where there is a location suitable that deflects the optical path as described above, the number of deflections of the optical path can be optionally set in accordance with the number of the locations. In a case where the number of deflections of the optical path is two, the directions of both deflections of the optical path may be the same, or the directions of the first deflection and the second deflection of the optical path may be opposite to each other. In the example shown in FIG. 6, the optical axis Z is located in the plane of the paper before and after the deflecting of the optical path through the two optical path deflecting members. However, the present disclosure is not limited to this. The optical path may be deflected in a direction perpendicular to the plane of the paper. However, it is preferable that the direction in which the optical path is deflected is appropriately set in consideration of the available area of the image circle.

The "magnification side" and "reduction side" according to the technology of the present disclosure are determined depending on the optical path, and the same applies to an imaging optical system that forms a deflected optical path. For example, in the imaging optical system that forms a deflected optical path, the phrase "the lens A is closer to the magnification side than the lens B" has the same meaning as the phrase "the lens A is on the optical path to be closer to the magnification side than the lens B". Therefore, the term "~closest to the magnification side" in the imaging optical system that forms the deflected optical path means that something is closest to the magnification side on the optical path in terms of arrangement order, and does not mean that the something is closest to the screen Scr in terms of distance.

The above-described preferred configuration and possible configurations can be optionally combined, and are preferably selectively adopted as appropriate according to required specifications. According to the present embodiment, it is possible to realize an imaging optical system which is capable of using rays of a wide area of an image circle including the vicinity of the optical axis and has favorable optical performance by keeping a lens diameter small while having a wide angle of view.

Next, numerical examples of the imaging optical system according to the technology of the present disclosure will be described.

Example 1

FIG. 1 shows a cross-sectional view of a lens configuration and rays of the imaging optical system according to Example 1. The configuration and the illustration method are as described above, and some redundant parts thereof will not be described. The imaging optical system according to Example 1 consists of a first optical system G1, a second optical system G2, and a third optical system G3 in order from the magnification side to the reduction side. The first optical system G1 consists of lenses L1a to L1f in order from the magnification side to the reduction side. The second optical system G2 consists of lenses L2a to L2k in order from the magnification side to the reduction side. The third optical system G3 consists of lenses L3a to L3g, an aperture stop St, and lenses L3h to L3n in order from the magnification side to the reduction side. A first intermediate image MI1 is formed between the first optical system G1 and the second optical system G2, and a second intermediate image MI2 is formed between the second optical system G2 and the third optical system G3.

Regarding the imaging optical system of Example 1, Tables 1A and 1B show basic lens data, Table 2 shows specification, and Table 3 shows the aspheric surface coefficients thereof. Here, the basic lens data is divided into two tables, Table 1A and Table 1B, in order to avoid lengthening of one table. Table 1A shows the first optical system G1 and the second optical system G2, and Table 1B shows the third optical system G3 and the optical member PP. Tables 1A and 1B show values obtained in a case where the distance from the magnification side imaging surface to the lens surface closest to the magnification side is 1550.

In Tables 1A and 1B, the column of Sn shows surface numbers. The surface closest to the magnification side is the first surface, and the surface numbers increase one by one toward the reduction side. The column of R shows radii of curvature of the respective surfaces. The column of D shows surface distances on the optical axis between the respective surfaces and the surfaces adjacent to the reduction side. Further, the column of Nd shows refractive indexes of the respective components at the d line, and the column of vd shows Abbe numbers of the respective components at the d line.

In Tables 1A and 1B, signs of radii of curvature of surface shapes convex toward the magnification side are set to be positive, and signs of radii of curvature of surface shapes convex toward the reduction side are set to be negative. In Table 1B, in a place of a surface number of a surface corresponding to the aperture stop St, the surface number and a term of (St) are noted. A value at the bottom place of D in Table 1 indicates a distance between the image display surface Sim and the surface closest to the reduction side in the table.

Table 2 shows the absolute value of the focal length |f|, the F number FNo., and the value of the maximum total angle of view 2ω, on a d line basis. (°) in the place of 2ω indicates that the unit thereof is a degree.

In the basic lens data, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am shows numerical values of the aspheric surface coefficients for each aspheric surface. m is an integer of 3 or more. For example, m=4, 6, 8, 10 for the aspheric surfaces of Example 1. The "E±n" (n: an integer) in numerical values of the aspheric surface coefficients of Table 3 indicates "×10±n". KA and Am are the aspheric surface coefficients in the aspheric surface expression represented by the following expression.

$$Zd = C \times H2/\{1+(1-KA \times C2 \times H2)^{1/2}\} + \Sigma Am \times Hm$$

Here,

Zd is an aspheric surface depth (a length of a perpendicular from a point on an aspheric surface at height H to a plane that is perpendicular to the optical axis and contacts with the vertex of the aspheric surface), H is a height (a distance from the optical axis to the lens surface), C is a paraxial curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Each of the following tables shows numerical values rounded off to predetermined decimal places.

TABLE 1A

Example 1

| Sn | R | D | Nd | vd |
|---|---|---|---|---|
| 1 | 147.7946 | 10.7403 | 1.72916 | 54.68 |
| 2 | 44.7071 | 4.8034 | | |
| *3 | 133.3356 | 5.8435 | 1.58573 | 59.70 |
| *4 | 38.1485 | 34.1834 | | |
| 5 | 132.4823 | 30.0007 | 1.80610 | 33.27 |
| 6 | −135.1744 | 5.9796 | | |
| 7 | −138.6883 | 29.9992 | 1.84666 | 23.78 |
| 8 | 225.1860 | 6.7570 | | |
| 9 | −80.4586 | 14.9991 | 1.77250 | 49.60 |
| 10 | −37.9774 | 0.2001 | | |
| 11 | 323.9486 | 12.6694 | 1.77250 | 49.60 |
| 12 | −111.0361 | 73.0244 | | |
| 13 | 104.3289 | 24.9992 | 1.80400 | 46.58 |
| 14 | −473.5056 | 34.1860 | | |
| 15 | −68.6404 | 25.0007 | 1.51742 | 52.43 |
| 16 | 104.6105 | 6.2112 | | |
| 17 | 216.2068 | 16.0801 | 1.80400 | 46.58 |
| 18 | −143.5173 | 50.0335 | | |
| 19 | 286.2820 | 12.3016 | 1.72916 | 54.68 |
| 20 | −181.1906 | 101.9231 | | |
| 21 | 166.2958 | 10.1691 | 1.49700 | 81.61 |
| 22 | −99.7880 | 0.1991 | | |
| 23 | 70.0990 | 15.3975 | 1.60311 | 60.64 |
| 24 | −69.6824 | 0.3780 | | |
| 25 | −66.9256 | 1.8005 | 1.74000 | 28.30 |
| 26 | 48.6288 | 24.1060 | | |
| 27 | −33.5706 | 1.7991 | 1.68893 | 31.07 |
| 28 | −43.7213 | 0.1991 | | |
| 29 | 178.0573 | 16.5633 | 1.59522 | 67.73 |
| 30 | −100.4780 | 69.2758 | | |
| 31 | 101.4829 | 19.2790 | 1.80100 | 34.97 |
| 32 | −1641.9796 | 0.1996 | | |
| 33 | 45.9542 | 16.0916 | 1.80610 | 33.27 |
| 34 | 61.4489 | 19.9997 | | |

TABLE 1B

Example 1

| Sn | R | D | Nd | vd |
|---|---|---|---|---|
| 35 | 409.0962 | 8.1298 | 1.80518 | 25.42 |
| 36 | 48.2416 | 10.9665 | | |
| 37 | −192.0879 | 1.7991 | 1.80518 | 25.42 |
| 38 | 82.2784 | 19.9195 | | |
| 39 | −32.3837 | 2.9422 | 1.60562 | 43.71 |
| 40 | −235.4556 | 5.0655 | | |
| 41 | −94.9332 | 17.8968 | 1.80518 | 25.42 |
| 42 | −48.7815 | 0.2006 | | |
| 43 | 513.9702 | 20.6740 | 1.77250 | 49.60 |
| 44 | −85.3754 | 0.2000 | | |
| 45 | 53.1373 | 20.0005 | 1.80400 | 46.58 |
| 46 | 1986.4668 | 1.2195 | | |
| 47 | −1350.6512 | 25.0009 | 1.67270 | 32.10 |
| 48 | 25.1241 | 28.4952 | | |
| 49(St) | ∞ | 2.3266 | | |
| 50 | −34.6262 | 8.1495 | 1.84666 | 23.78 |
| 51 | 96.9027 | 0.1006 | | |
| 52 | 89.2564 | 9.1530 | 1.49700 | 81.61 |
| 53 | −40.9579 | 2.1969 | | |
| 54 | 64.9451 | 22.9578 | 1.49700 | 81.61 |
| 55 | −70.8361 | 0.2008 | | |
| 56 | 127.6592 | 13.1233 | 1.49700 | 81.61 |
| 57 | −47.1138 | 0.6331 | | |
| 58 | −44.7589 | 2.2620 | 1.74950 | 35.33 |
| 59 | 79.6891 | 4.3197 | | |
| 60 | 662.8004 | 8.2456 | 1.49700 | 81.61 |
| 61 | −88.5837 | 6.1239 | | |
| 62 | 160.3263 | 12.3154 | 1.89286 | 20.36 |

TABLE 1B-continued

Example 1

| Sn | R | D | Nd | vd |
|---|---|---|---|---|
| 63 | −111.9534 | 34.0000 | | |
| 64 | ∞ | 61.8380 | 1.51633 | 64.14 |
| 65 | ∞ | 3.9696 | | |

TABLE 2

Example 1

| |f| | 11.32 |
|---|---|
| FNo. | 2.10 |
| 2ω(°) | 133.0 |

TABLE 3

Example 1

| Sn | 3 | 4 |
|---|---|---|
| KA | 1.000000000000E+00 | 1.000000000000E+00 |
| A4 | 9.002568559587E−06 | 7.969564472748E−06 |
| A6 | −3.654621931458E−09 | 2.033232540435E−09 |
| A8 | 1.753195342563E−12 | −8.742653059749E−13 |
| A10 | −4.942672948841E−16 | −2.950185751031E−15 |

Figure 5:
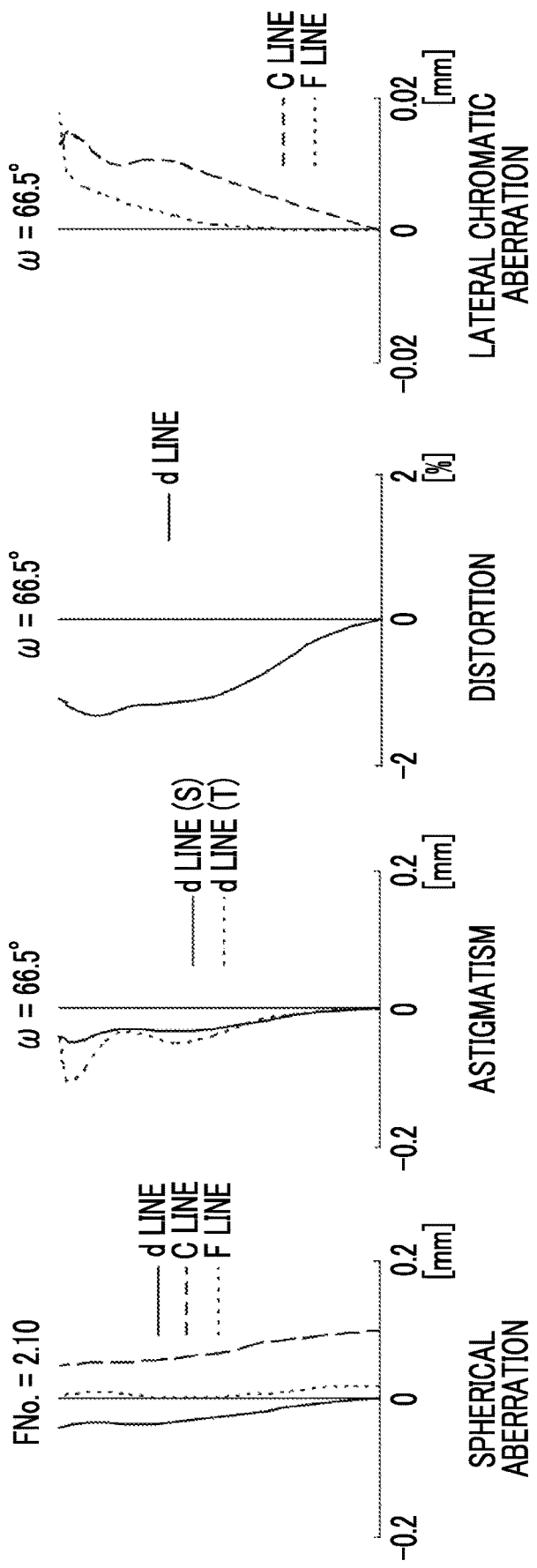
FIG. 5 is an aberration diagram of the imaging optical system according to Example 1 of the present disclosure.

FIG. 5 shows aberration diagrams of the imaging optical system according to Example 1 in a case where the distance from the magnification side imaging surface to the lens surface closest to the magnification side is 1550. FIG. 5 shows, in order from the left, spherical aberration, astigmatism, distortion, and lateral chromatic aberration. In the spherical aberration diagram, aberrations at the d line, C line, and F line are indicated by the solid line, the long dashed line, and the short dashed line, respectively. In the astigmatism diagram, the aberration at the d line in the sagittal direction is indicated by a solid line, and the aberration at the d line in the tangential direction is indicated by the short dashed line. In the distortion diagram, aberration at the d line is indicated by the solid line. In the lateral chromatic aberration diagram, aberrations at the C line and the F line are indicated by the long dashed line and the short dashed line, respectively. In the spherical aberration diagram, FNo. indicates an F number. In the other aberration diagrams, ω indicates a half angle of view.

Symbols, meanings, description methods, and illustration methods of the respective data pieces according to Example 1 are the same as those in the following examples unless otherwise noted. Therefore, in the following description, repeated description will be omitted.

Figure 6:
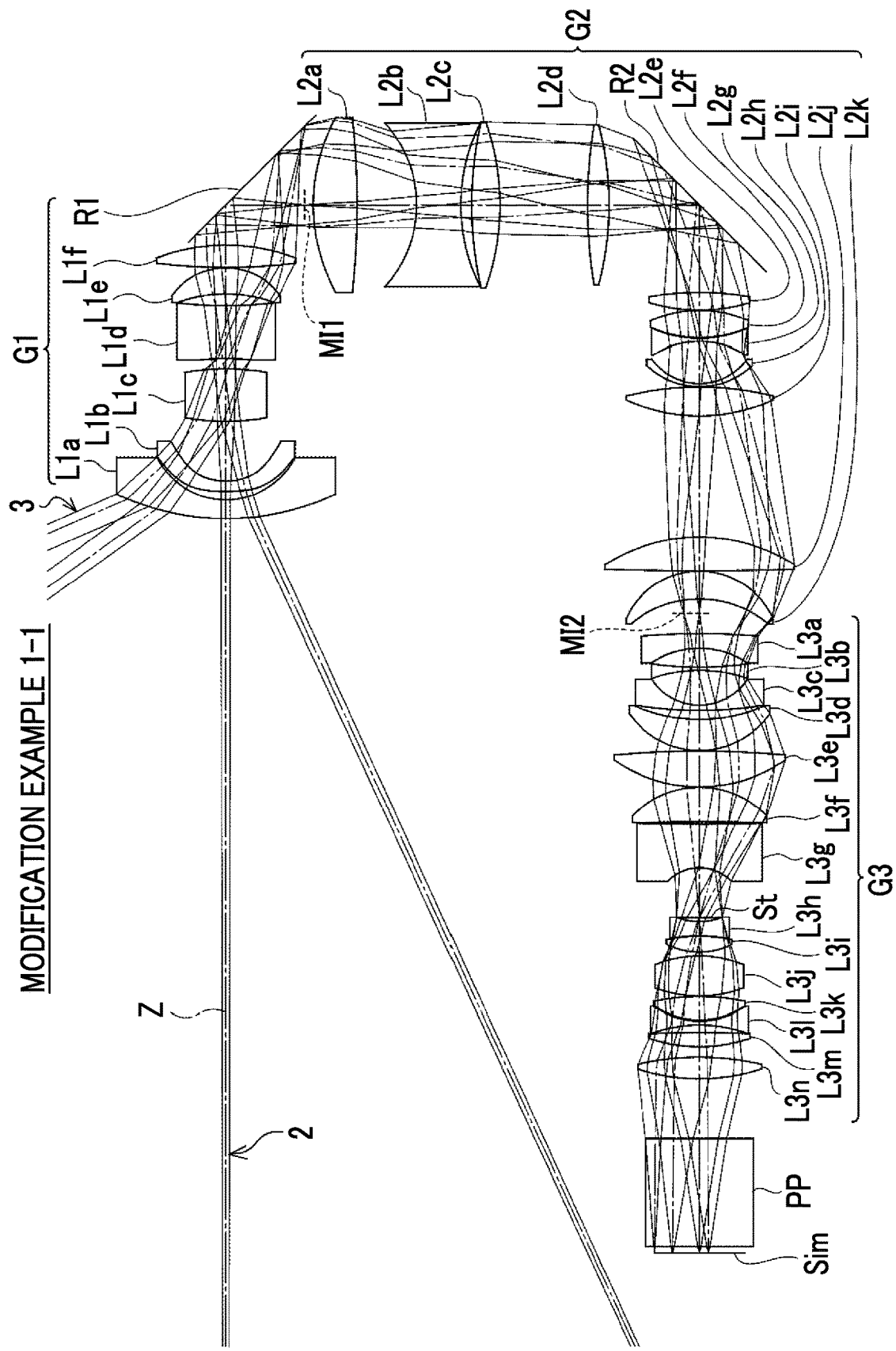
FIG. 6 is a cross-sectional view showing a configuration and rays of an imaging optical system according to Modification Example 1-1 of Example 1 of the present disclosure.
Figure 7:
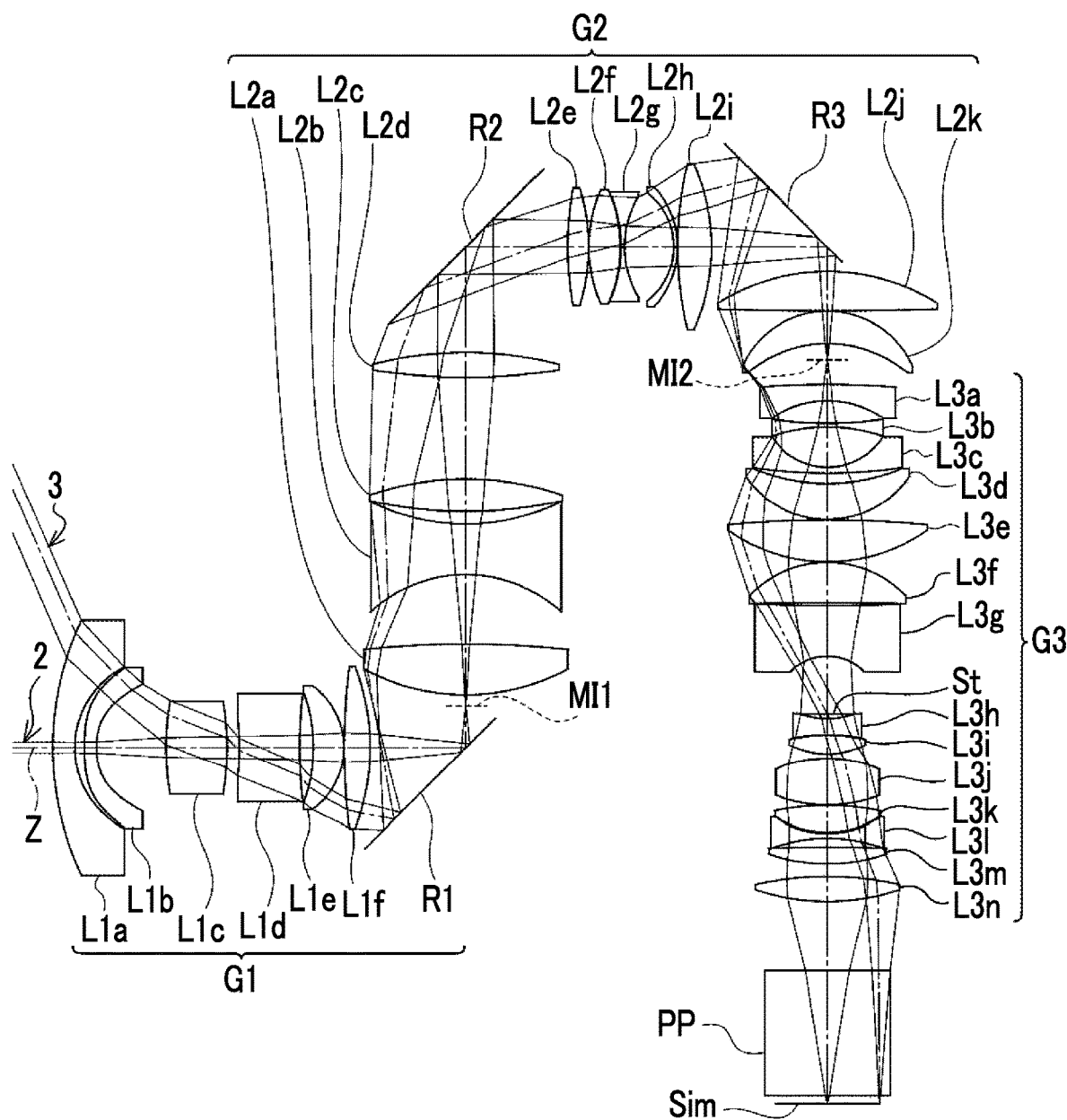
FIG. 7 is a cross-sectional view showing a configuration and rays of an imaging optical system according to Modification Example 1-2 of Example 1 of the present disclosure.

FIGS. 6 and 7 show examples, in which the optical path is deflected, as modification examples of Example 1. The imaging optical system of Modification Example 1-1 shown in FIG. 6 is configured such two optical path deflecting members are added to the imaging optical system of Example 1 so as to deflect the optical path twice. In the imaging optical system of Modification 1-1, a first optical path deflecting member R1, which deflects the optical path by 90 degrees, is disposed to be closest to the reduction side in the first optical system G1, and a second optical path deflecting member R2, which deflects the optical path by 90 degrees, is disposed inside the second optical system G2.

The imaging optical system of Modification Example 1-2 shown in FIG. 7 is configured such that three optical path deflecting members are added to the imaging optical system of Example 1 so as to deflect the optical path three times. In the imaging optical system of Modification Example 1-2, a first optical path deflecting member R1, which deflects the optical path by 90 degrees, is disposed to be closest to the reduction side in the first optical system G1, and a second optical path deflecting member R2, which deflects the optical path by 90 degrees, and a third optical path deflecting member R3, which deflects the optical path by 90 degrees, are disposed inside the second optical system G2.

Example 2

Figure 8:
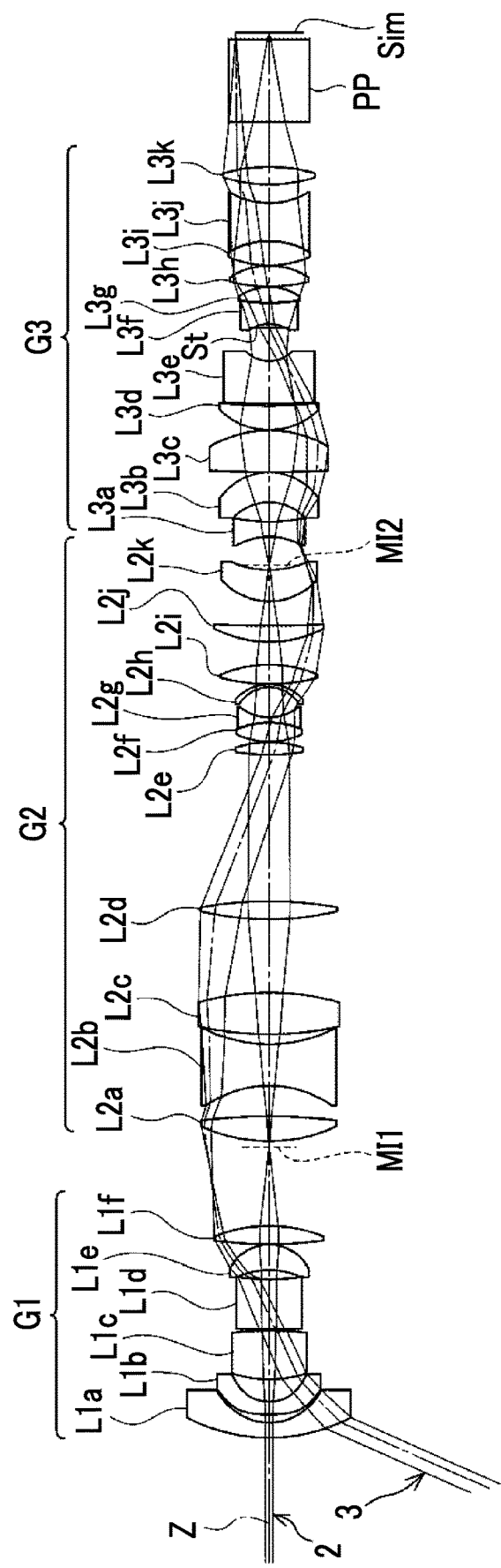
FIG. 8 is a cross-sectional view showing a configuration and rays of an imaging optical system according to Example 2 of the present disclosure.

FIG. 8 shows a cross-sectional view of a lens configuration and rays of the imaging optical system according to Example 2. The imaging optical system according to Example 2 consists of a first optical system G1, a second optical system G2, and a third optical system G3 in order from the magnification side to the reduction side. The first optical system G1 consists of lenses L1a to L1f in order from the magnification side to the reduction side. The second optical system G2 consists of lenses L2a to L2k in order from the magnification side to the reduction side. The third optical system G3 consists of lenses L3a to L3e, an aperture stop St, and lenses L3f to L3k in order from the magnification side to the reduction side. A first intermediate image MI1 is formed between the first optical system G1 and the second optical system G2, and a second intermediate image MI2 is formed between the second optical system G2 and the third optical system G3.

Figure 9:
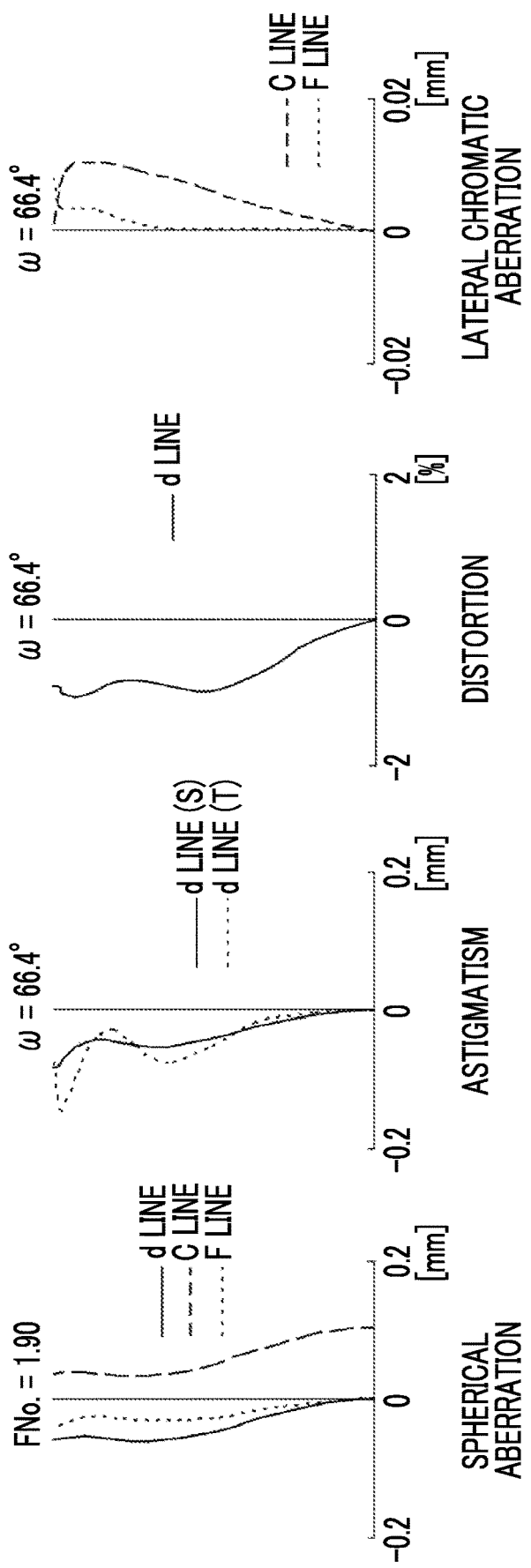
FIG. 9 is an aberration diagram of the imaging optical system according to Example 2 of the present disclosure.

Regarding the imaging optical system of Example 2, Tables 4A and 4B show basic lens data, Table 5 shows specification, Table 6 shows aspheric surface coefficients thereof, and FIG. 9 shows aberration diagrams. Table 4A, Table 4B, and FIG. 9 show data in a case where the distance from the magnification side imaging surface to the lens surface closest to the magnification side is 1240.

TABLE 4A

Example 2

| Sn | R | D | Nd | vd |
|---|---|---|---|---|
| 1 | 110.0108 | 9.0653 | 1.79952 | 42.22 |
| 2 | 35.8446 | 4.8514 | | |
| *3 | 153.0777 | 7.7445 | 1.58573 | 59.70 |
| *4 | 28.2131 | 13.3733 | | |
| 5 | 77.0917 | 29.2470 | 1.80518 | 25.42 |
| 6 | −205.6838 | 0.8240 | | |
| 7 | 734.2256 | 30.0009 | 1.84666 | 23.78 |
| 8 | 140.6855 | 5.4176 | | |
| 9 | −48.9301 | 14.9991 | 1.80400 | 46.58 |
| 10 | −27.7925 | 0.1991 | | |
| 11 | 228.5134 | 11.1523 | 1.80400 | 46.58 |
| 12 | −89.1338 | 50.1719 | | |
| 13 | 100.2827 | 15.0009 | 1.80400 | 46.58 |
| 14 | −347.9671 | 18.2872 | | |
| 15 | −68.6332 | 25.0009 | 1.48749 | 70.24 |
| 16 | 90.4136 | 6.0677 | | |
| 17 | 207.7558 | 24.5838 | 1.80400 | 46.58 |
| 18 | −158.7402 | 43.9574 | | |
| 19 | 177.4103 | 10.9172 | 1.80400 | 46.58 |
| 20 | −230.8068 | 87.5080 | | |
| 21 | 130.8111 | 7.5659 | 1.49700 | 81.61 |
| 22 | −68.6306 | 0.1991 | | |
| 23 | 46.2773 | 11.4335 | 1.62041 | 60.29 |
| 24 | −52.3695 | 0.3259 | | |
| 25 | −49.6806 | 2.9844 | 1.69895 | 30.13 |
| 26 | 29.1728 | 17.9692 | | |
| 27 | −21.9108 | 1.7991 | 1.63980 | 34.47 |
| 28 | −28.4264 | 0.2007 | | |

TABLE 4A-continued

Example 2

| Sn | R | D | Nd | vd |
|---|---|---|---|---|
| 29 | 119.2657 | 11.7135 | 1.59522 | 67.73 |
| 30 | −75.7122 | 13.6272 | | |
| 31 | 73.6064 | 9.6885 | 1.65160 | 58.55 |
| 32 | 755.8900 | 14.6069 | | |
| 33 | 39.6778 | 18.8055 | 1.80400 | 46.58 |
| 34 | 57.5965 | 20.0004 | | |

TABLE 4B

Example 2

| Sn | R | D | Nd | vd |
|---|---|---|---|---|
| 35 | −41.2495 | 8.7787 | 1.80518 | 25.42 |
| 36 | 119.5109 | 11.5764 | | |
| 37 | −30.7289 | 18.0009 | 1.80518 | 25.42 |
| 38 | −37.2140 | 0.1997 | | |
| 39 | 822.5438 | 25.0008 | 1.80400 | 46.58 |
| 40 | −71.6238 | 0.1991 | | |
| 41 | 44.1462 | 14.4031 | 1.80400 | 46.58 |
| 42 | 240.1845 | 1.3997 | | |
| 43 | 480.6323 | 25.0005 | 1.60342 | 38.03 |
| 44 | 20.0724 | 20.1133 | | |
| 45(St) | ∞ | 2.0999 | | |
| 46 | −23.0813 | 12.6801 | 1.84666 | 23.78 |
| 47 | 126.1208 | 0.2938 | | |
| 48 | 156.6799 | 9.2612 | 1.49700 | 81.61 |
| 49 | −33.8103 | 0.2006 | | |
| 50 | 98.4338 | 12.2403 | 1.49700 | 81.61 |
| 51 | −47.2195 | 0.2000 | | |
| 52 | 63.5145 | 14.4539 | 1.53775 | 74.70 |
| 53 | −50.3723 | 0.2882 | | |
| 54 | −49.1451 | 22.7135 | 1.62004 | 36.26 |
| 55 | 48.8188 | 11.2145 | | |
| 56 | 98.5649 | 10.4245 | 1.89286 | 20.36 |
| 57 | −107.0048 | 27.2000 | | |
| 58 | ∞ | 49.4704 | 1.51633 | 64.14 |
| 59 | ∞ | 3.9794 | | |

TABLE 5

Example 2

| | |
|---|---|
| \|f\| | 9.05 |
| FNo. | 1.90 |
| 2ω(°) | 132.8 |

TABLE 6

Example 2

| Sn | 3 | 4 |
|---|---|---|
| KA | 1.000000000000E+00 | 1.000000000000E+00 |
| A4 | 1.795009521615E−05 | 1.692067099568E−05 |
| A6 | −1.206387019591E−08 | 1.283455322420E−08 |
| A8 | 9.228349235864E−12 | −1.290444635484E−11 |
| A10 | −3.386182101615E−15 | −3.569131609040E−14 |

Figure 10:
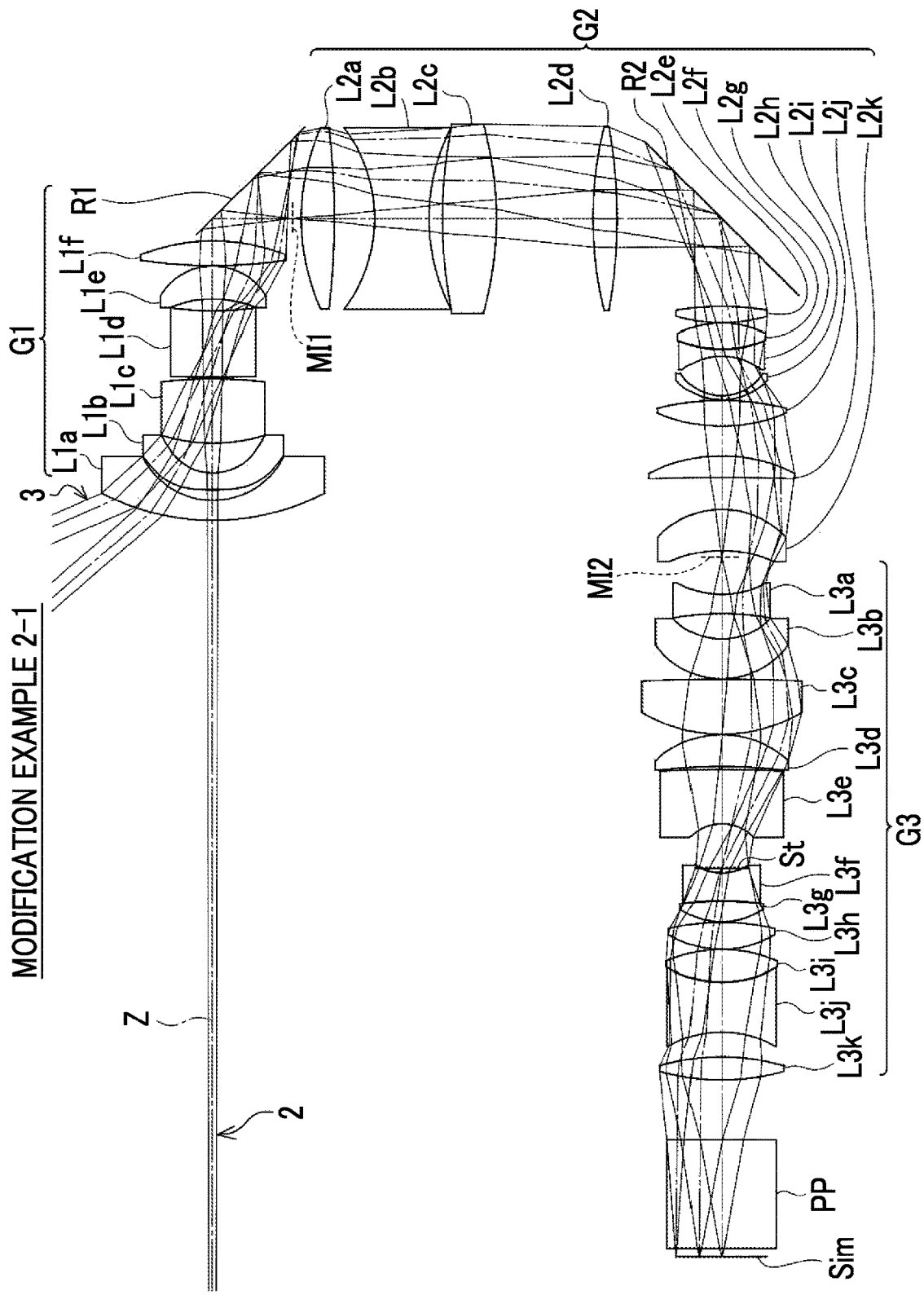
FIG. 10 is a cross-sectional view showing a configuration and rays of an imaging optical system according to Modification Example 2-1 of Example 2 of the present disclosure.

FIG. 10 shows an example, in which the optical path is deflected, as a modification example of Example 2. The imaging optical system of Modification Example 2-1 shown in FIG. 10 is configured such that two optical path deflecting members are added to the imaging optical system of Example 2 so as to deflect the optical path twice. In the imaging optical system of Modification Example 2-1, a first optical path deflecting member R1, which deflects the optical path by 90 degrees, is disposed to be closest to the reduction side in the first optical system G1, and a second optical path deflecting member R2, which deflects the optical path by 90 degrees, is disposed inside the second optical system G2.

Example 3

Figure 11:
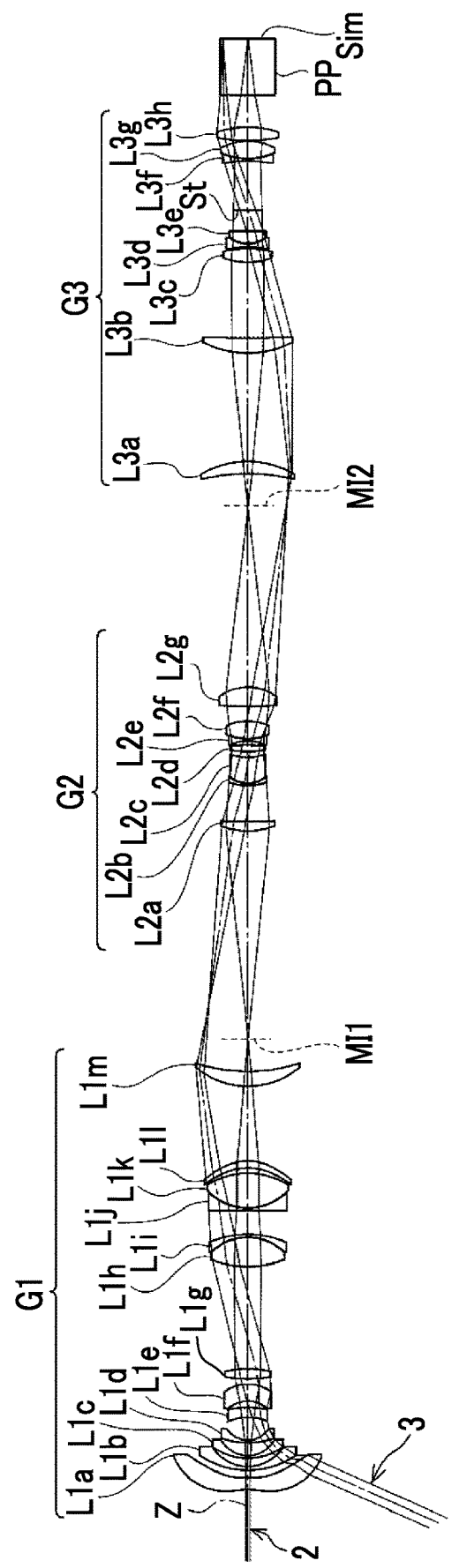
FIG. 11 is a cross-sectional view showing a configuration and rays of an imaging optical system according to Example 3 of the present disclosure.

FIG. 11 is a cross-sectional view of a lens configuration and rays of the imaging optical system according to Example 3. The imaging optical system according to Example 3 consists of a first optical system G1, a second optical system G2, and a third optical system G3 in order from the magnification side to the reduction side. The first optical system G1 consists of lenses L1a to L1m in order from the magnification side to the reduction side. The second optical system G2 consists of lenses L2a to L2g in order from the magnification side to the reduction side. The third optical system G3 consists of lenses L3a to L3e, an aperture stop St, and lenses L3f to L3h in order from the magnification side to the reduction side. A first intermediate image MI1 is formed between the first optical system G1 and the second optical system G2, and a second intermediate image MI2 is formed between the second optical system G2 and the third optical system G3.

Figure 12:
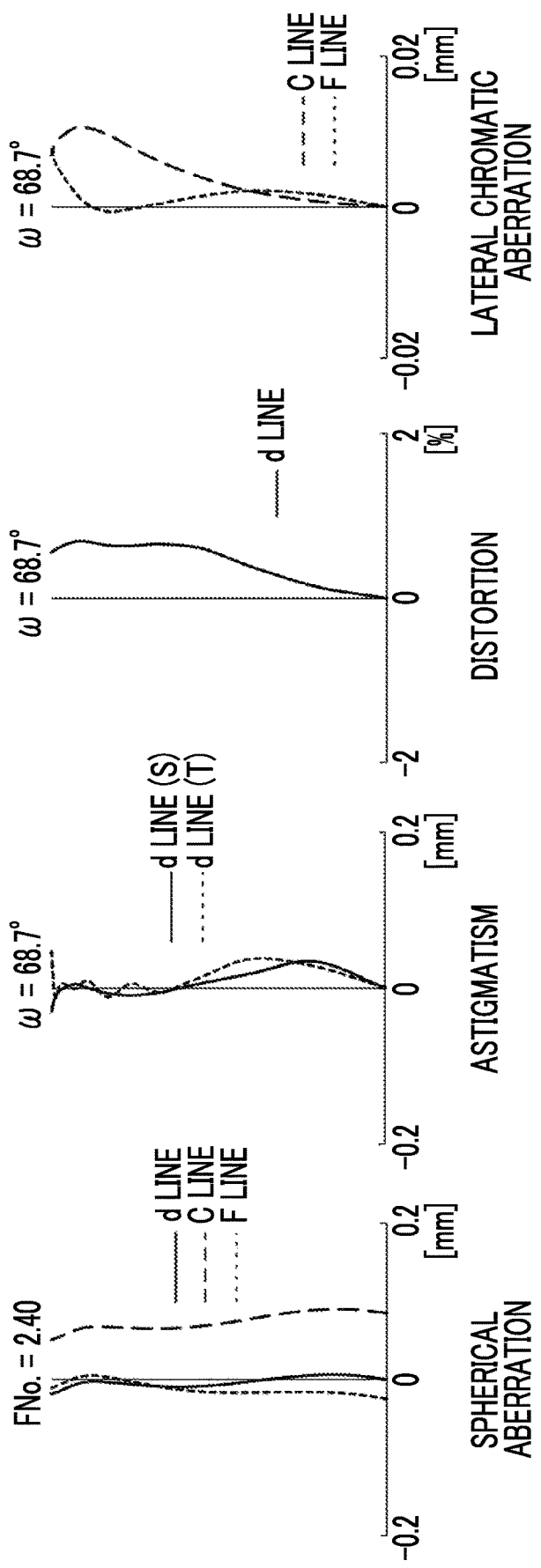
FIG. 12 is an aberration diagram of the imaging optical system according to Example 3 of the present disclosure.

Regarding the imaging optical system of Example 3, Tables 7A and 7B show basic lens data, Table 8 shows specification, Table 9 shows aspheric surface coefficients thereof, and FIG. 12 shows aberration diagrams. Table 7A, Table 7B, and FIG. 12 show data in the case where the distance from the magnification side imaging surface to the lens surface closest to the magnification is 752.7.

TABLE 7A

Example 3

| Sn | R | D | Nd | vd |
|---|---|---|---|---|
| *1 | −22.7843 | 5.6000 | 1.53158 | 55.08 |
| *2 | −68.8174 | 3.3431 | | |
| 3 | 48.8035 | 1.8000 | 1.80518 | 25.45 |
| 4 | 23.7632 | 3.9001 | | |
| 5 | 34.3699 | 1.2500 | 1.83481 | 42.72 |
| 6 | 17.0998 | 6.1047 | | |
| 7 | 48.9982 | 1.1000 | 1.80400 | 46.58 |
| 8 | 13.8324 | 10.7228 | | |
| 9 | −29.7983 | 4.6993 | 1.48749 | 70.44 |
| 10 | −53.1681 | 2.9867 | | |
| 11 | −16.6862 | 7.9991 | 1.80400 | 46.58 |
| 12 | −22.1270 | 2.5505 | | |
| 13 | 84.2628 | 4.4797 | 1.80518 | 25.45 |
| 14 | −64.7206 | 48.0472 | | |
| 15 | 58.3901 | 13.6132 | 1.49700 | 81.54 |
| 16 | −30.3703 | 1.3000 | 1.84666 | 23.78 |
| 17 | −59.1878 | 11.1667 | | |
| 18 | 2765.7781 | 1.2500 | 1.84666 | 23.78 |
| 19 | 31.5564 | 16.3416 | 1.49700 | 81.54 |
| 20 | −44.7293 | 2.4799 | | |
| *21 | −31.0853 | 3.4000 | 1.51007 | 56.24 |
| *22 | −25.9322 | 34.9993 | | |
| 23 | 46.7960 | 6.9686 | 1.80518 | 25.45 |
| 24 | 97.3830 | 112.7394 | | |

TABLE 7B

Example 3

| Sn | R | D | Nd | vd |
|---|---|---|---|---|
| 25 | 44.8980 | 4.4354 | 1.80610 | 33.27 |
| 26 | 839.7577 | 16.4661 | | |
| 27 | 30.4016 | 1.0000 | 1.84666 | 23.78 |

TABLE 7B-continued

Example 3

| Sn | R | D | Nd | vd |
|---|---|---|---|---|
| 28 | 15.4624 | 12.0100 | 1.48749 | 70.44 |
| 29 | 31.2381 | 2.8305 | | |
| 30 | 86.8437 | 2.8840 | 1.80518 | 25.45 |
| 31 | −109.2009 | 1.9812 | | |
| 32 | −21.2884 | 1.0000 | 1.80400 | 46.58 |
| 33 | 33.5958 | 8.2385 | 1.49700 | 81.54 |
| 34 | −28.1427 | 6.9325 | | |
| 35 | 215.9032 | 9.0712 | 1.49700 | 81.54 |
| 36 | −27.4504 | 99.9996 | | |
| 37 | −110.6783 | 5.7145 | 1.80400 | 46.58 |
| 38 | −54.4489 | 51.0291 | | |
| 39 | 59.0752 | 7.0694 | 1.77250 | 49.60 |
| 40 | 571.2532 | 35.2280 | | |
| 41 | 39.5448 | 6.4823 | 1.65160 | 58.55 |
| 42 | −57.3008 | 0.6032 | | |
| 43 | −58.2157 | 1.5009 | 1.69895 | 30.13 |
| 44 | 16.6240 | 0.2965 | | |
| 45 | 16.3633 | 5.7278 | 1.48749 | 70.44 |
| 46 | 491.9133 | 9.9226 | | |
| 47(St) | ∞ | 23.0015 | | |
| 48 | −73.8866 | 1.2006 | 1.69680 | 55.53 |
| 49 | 38.6457 | 8.2694 | 1.49700 | 81.54 |
| 50 | −32.4219 | 0.0991 | | |
| 51 | 87.1598 | 6.3766 | 1.80518 | 25.45 |
| 52 | −55.0585 | 15.0000 | | |
| 53 | ∞ | 26.5000 | 1.51633 | 64.14 |
| 54 | ∞ | 0.0272 | | |

TABLE 8

Example 3

| |f| | 4.99 |
|---|---|
| FNo. | 2.40 |
| 2ω(°) | 137.4 |

TABLE 9

Example 3

| Sn | 1 | 2 |
|---|---|---|
| KA | −5.597980971211E−01 | −4.999999975361E+00 |
| A3 | 2.510527488313E−03 | 3.511312067244E−03 |
| A4 | −1.901423833968E−04 | −5.073029345472E−04 |
| A5 | 7.051527070619E−06 | 3.974540261671E−05 |
| A6 | 7.320901751491E−07 | 2.926027718482E−07 |
| A7 | −9.000228854029E−08 | −2.248533865896E−07 |
| A8 | 1.745592655144E−09 | 5.594011711523E−09 |
| A9 | 1.877123657031E−10 | 7.632343116156E−10 |
| A10 | −9.445042960744E−12 | −4.130878196081E−11 |
| A11 | −9.160768598151E−14 | −7.475692751605E−13 |
| A12 | 1.493926764218E−14 | 9.428499585636E−14 |
| A13 | −1.641905181353E−16 | −7.266782652020E−16 |
| A14 | −1.063461588948E−17 | −9.788147593542E−17 |
| A15 | 2.565553020076E−19 | 2.139519194424E−18 |
| A16 | 2.788561638688E−21 | 4.142815385452E−20 |
| A17 | −1.357808923286E−22 | −1.668598940299E−21 |
| A18 | 3.914311817552E−25 | 1.636063361795E−24 |
| A19 | 2.579676897797E−26 | 4.470899908167E−25 |
| A20 | −2.415121388499E−28 | −4.325012213072E−27 |

| Sn | 21 | 22 |
|---|---|---|
| KA | −4.412426730387E−02 | −5.000001485776E+00 |
| A3 | 0.000000000000E+00 | 0.000000000000E+00 |
| A4 | 1.236272319287E−06 | −3.235177460791E−05 |
| A5 | 1.308961841058E−06 | 1.010155737305E−06 |
| A6 | −9.703753150598E−08 | 1.902681194240E−07 |
| A7 | −7.530963486608E−09 | −3.119941449663E−08 |
| A8 | 9.245238660380E−10 | 1.562633441153E−09 |

TABLE 9-continued

Example 3

| A9 | −2.678558217279E−12 | 7.225915475510E−11 |
|---|---|---|
| A10 | −2.507458899939E−12 | −1.102175853423E−11 |
| A11 | 5.386762800825E−14 | 1.916807594066E−13 |
| A12 | 3.231219979512E−15 | 2.591030249581E−14 |
| A13 | −1.047614970529E−16 | −1.149510133027E−15 |
| A14 | −2.040188178055E−18 | −2.185050991658E−17 |
| A15 | 9.047059636809E−20 | 2.026604453705E−18 |
| A16 | 4.936010295720E−22 | −6.148676968192E−21 |
| A17 | −3.738620671792E−23 | −1.570948110067E−21 |
| A18 | 5.073597545492E−26 | 1.927806181798E−23 |
| A19 | 6.017302786605E−27 | 4.583452067695E−25 |
| A20 | −3.123098946881E−29 | −7.842909191608E−27 |

Figure 13:
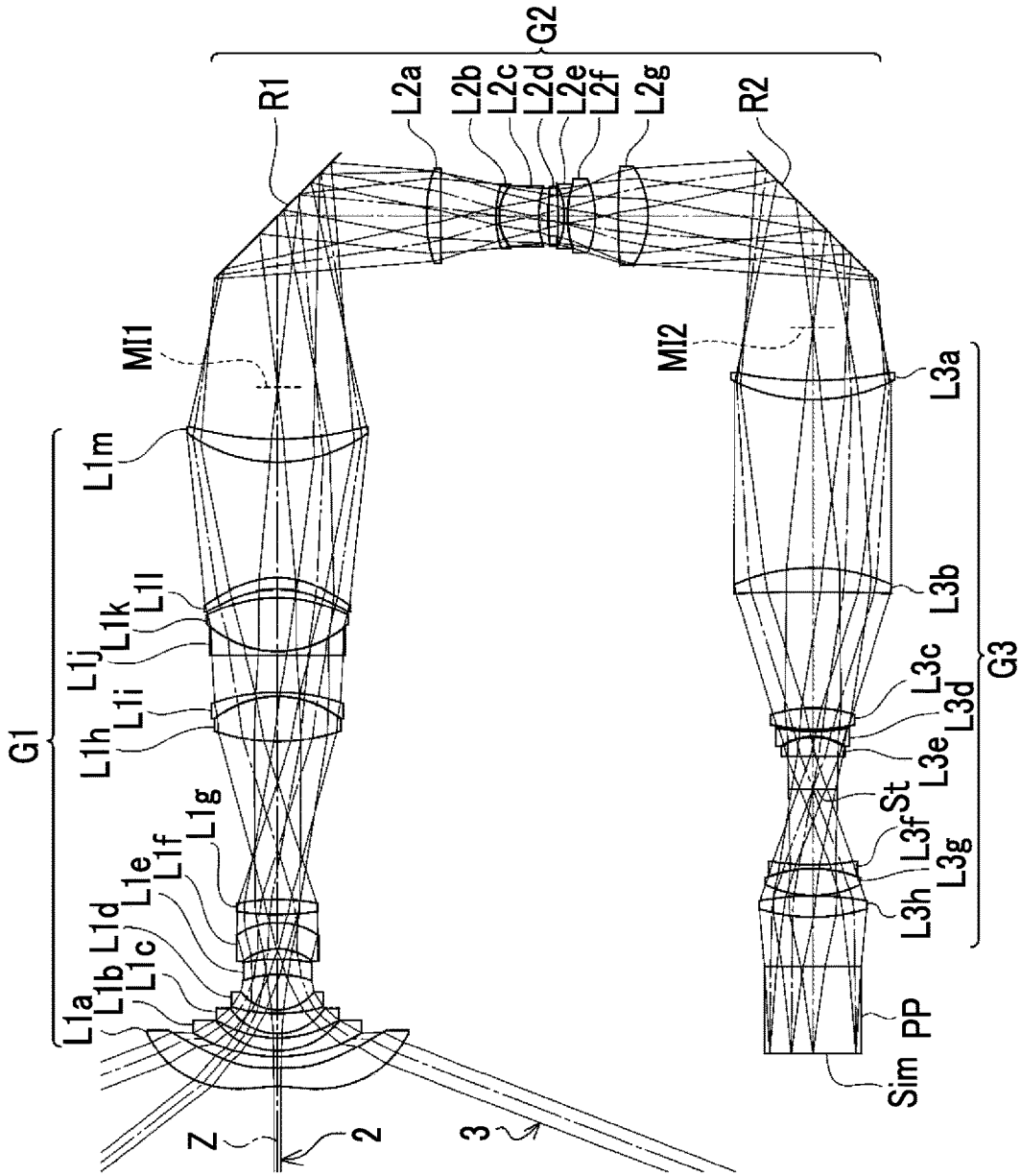
FIG. 13 is a cross-sectional view showing a configuration and rays of an imaging optical system according to Modification Example 3-1 of Example 3 of the present disclosure.
Figure 14:
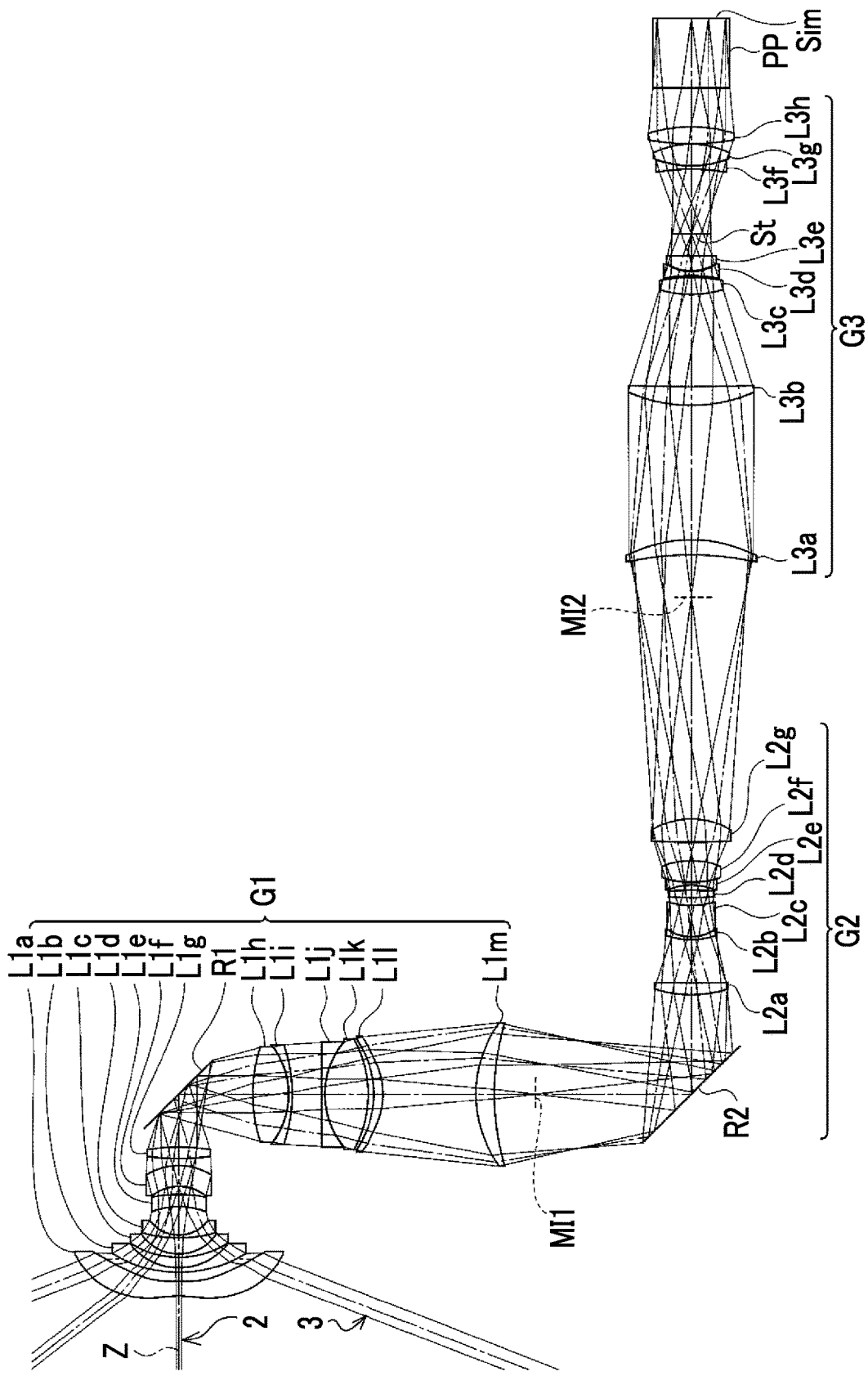
FIG. 14 is a cross-sectional view showing a configuration and rays of an imaging optical system according to Modification Example 3-2 of Example 3 of the present disclosure.
Figure 15:
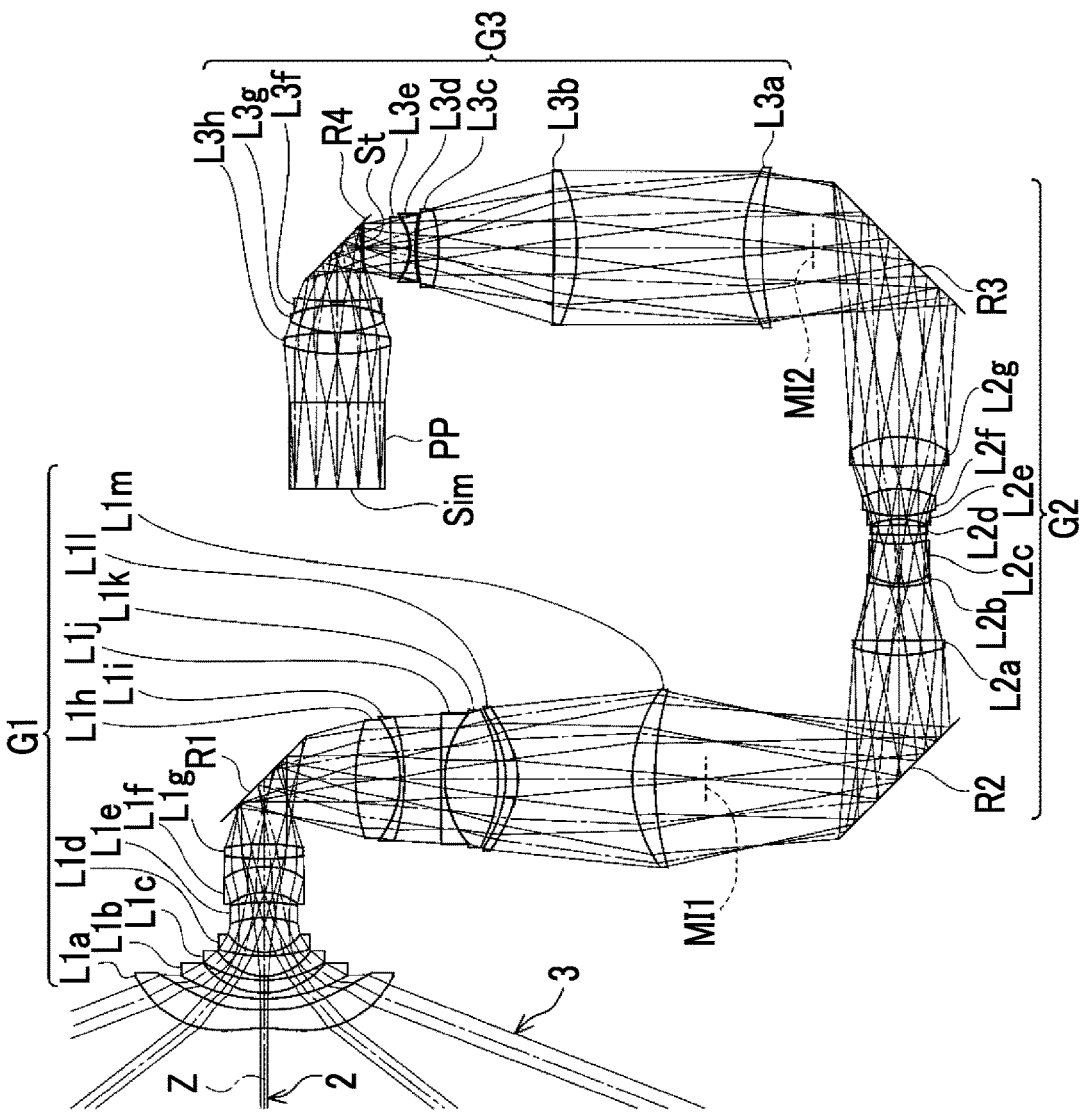
FIG. 15 is a cross-sectional view showing a configuration and rays of an imaging optical system according to Modification Example 3-3 of Example 3 of the present disclosure.

FIGS. 13, 14, and 15 show examples, in which the optical path is deflected, as modification examples of Example 3. The imaging optical system of Modification Example 3-1 shown in FIG. 13 is configured such that two optical path deflecting members are added to the imaging optical system of Example 3 so as to deflect the optical path twice. In the imaging optical system of Modification 3-1, a first optical path deflecting member R1, which deflects the optical path by 90 degrees, is disposed to be closest to the magnification side in the second optical system G2, and a second optical path deflecting member R2, which deflects the optical path by 90 degrees, is disposed to be closest to the reduction side in the second optical system G2.

The imaging optical system of Modification Example 3-2 shown in FIG. 14 is configured such that two optical path deflecting members are added to the imaging optical system of Example 3 so as to deflect the optical path twice. In the imaging optical system of Modification 3-2, a first optical path deflecting member R1, which deflects the optical path by 90 degrees, is disposed inside the first optical system G1, and a second optical path deflecting member R2, which deflects the optical path by 90 degrees, is disposed to be closest to the magnification side in the second optical system G2.

The imaging optical system of Modification Example 3-3 shown in FIG. 15 is configured such that four optical path deflecting members are added to the imaging optical system of Example 3 so as to deflect the optical path four times. In the imaging optical system of Modification Example 3-3, a first optical path deflecting member R1 that deflects the optical path by 90 degrees is disposed inside the first optical system G1, a second optical path deflecting member R2 that deflects the optical path by 90 degrees is disposed to be closest to the magnification side in the second optical system G2, a third optical path deflecting member R3 that deflects the optical path by 90 degrees is disposed to be closest to the reduction side in the second optical system G2, and a fourth optical path deflecting member R4 that deflects the optical path by 90 degrees is disposed inside the third optical system G3.

Example 4

Figure 16:
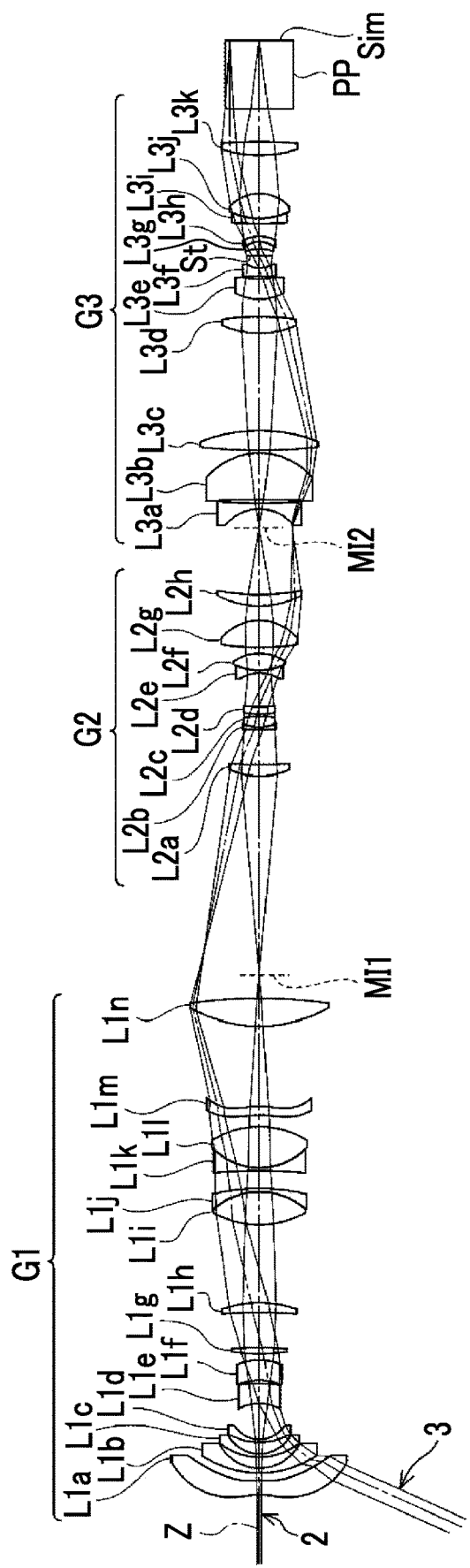
FIG. 16 is a cross-sectional view showing a configuration and rays of an imaging optical system according to Example 4 of the present disclosure.

FIG. 16 shows a cross-sectional view of a lens configuration and rays of the imaging optical system of Example 4. The imaging optical system according to Example 4 consists of a first optical system G1, a second optical system G2, and a third optical system G3 in order from the magnification side to the reduction side. The first optical system G1 consists of lenses L1a to L1n in order from the magnification side to the reduction side. The second optical system G2 consists of lenses L2a to L2h in order from the magnification side to the reduction side. The third optical system G3 consists of lenses L3a to L3f, an aperture stop St, and lenses L3g to L3k in order from the magnification side to the reduction side. A first intermediate image MI1 is formed between the first optical system G1 and the second optical system G2, and a second intermediate image MI2 is formed between the second optical system G2 and the third optical system G3.

Figure 17:
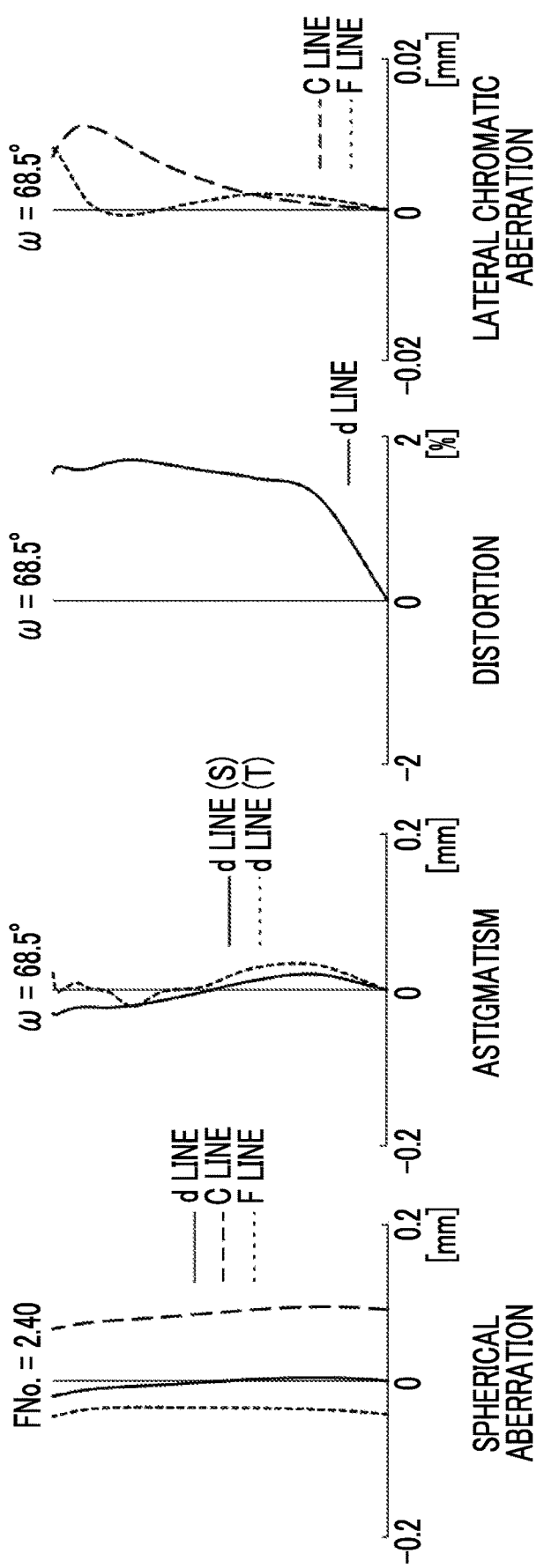
FIG. 17 is an aberration diagram of the imaging optical system according to Example 4 of the present disclosure.

Regarding the imaging optical system of Example 4, Tables 10A and 10B show basic lens data, Table 11 shows specification, Table 12 shows aspheric surface coefficients thereof, and FIG. 17 shows aberration diagrams. Table 10A, Table 10B, and FIG. 17 show data in a case where the distance from the magnification side imaging surface to the lens surface closest to the magnification side is 752.7.

TABLE 10A

Example 4

| Sn | R | D | Nd | vd |
|---|---|---|---|---|
| *1 | −23.4002 | 5.6000 | 1.53158 | 55.08 |
| *2 | −67.4066 | 2.9737 | | |
| 3 | 50.2132 | 1.8000 | 1.77250 | 49.60 |
| 4 | 21.1622 | 4.3629 | | |
| 5 | 30.5740 | 1.2500 | 1.84666 | 23.78 |
| 6 | 16.7031 | 4.5068 | | |
| 7 | 30.0574 | 1.1000 | 1.77250 | 49.60 |
| 8 | 13.8399 | 14.0250 | | |
| 9 | −21.2316 | 7.8883 | 1.48749 | 70.44 |
| 10 | −72.8075 | 1.1582 | | |
| 11 | −29.1761 | 7.9388 | 1.51742 | 52.43 |
| 12 | −26.8894 | 2.4254 | | |
| 13 | 98.5362 | 2.4578 | 1.80518 | 25.45 |
| 14 | −131.0927 | 13.6633 | | |
| 15 | −274.1587 | 3.7214 | 1.77250 | 49.60 |
| 16 | −56.5163 | 30.2783 | | |
| 17 | 46.3619 | 12.8813 | 1.49700 | 81.54 |
| 18 | −33.4651 | 1.3000 | 1.84666 | 23.78 |
| 19 | −97.4449 | 6.8150 | | |
| 20 | −254.1227 | 1.2500 | 1.84666 | 23.78 |
| 21 | 31.8864 | 16.0184 | 1.49700 | 81.54 |
| 22 | −43.1246 | 4.5068 | | |
| *23 | −45.7465 | 3.4000 | 1.51007 | 56.24 |
| *24 | −40.5167 | 31.1565 | | |
| 25 | 67.8839 | 10.7414 | 1.80518 | 25.45 |
| 26 | −256.5697 | 86.3175 | | |

TABLE 10B

Example 4

| Sn | R | D | Nd | vd |
|---|---|---|---|---|
| 27 | 35.6505 | 4.4354 | 1.80610 | 33.27 |
| 28 | 434.1509 | 13.5330 | | |
| 29 | 145.0938 | 1.0000 | 1.84666 | 23.78 |
| 30 | 16.9932 | 4.2289 | 1.48749 | 70.44 |
| 31 | −48.4652 | 0.7719 | | |
| 32 | 33.3611 | 2.9569 | 1.80518 | 25.45 |
| 33 | 71.0231 | 13.1476 | | |
| 34 | −17.1088 | 1.0000 | 1.77250 | 49.60 |
| 35 | 27.3353 | 6.6474 | 1.49700 | 81.54 |
| 36 | −21.5932 | 2.3361 | | |
| 37 | 120.6863 | 10.5218 | 1.49700 | 81.54 |
| 38 | −23.7460 | 5.6358 | | |
| 39 | 42.9176 | 4.5218 | 1.84666 | 23.78 |
| 40 | 109.5455 | 33.1011 | | |
| 41 | −20.7702 | 2.2073 | 1.76182 | 26.52 |
| 42 | 273.0566 | 1.4042 | | |
| 43 | −476.8238 | 18.2064 | 1.80400 | 46.58 |
| 44 | −33.3866 | 1.0686 | | |
| 45 | 256.8037 | 7.6457 | 1.80400 | 46.58 |
| 46 | −80.6379 | 38.0040 | | |
| 47 | 43.9334 | 6.4580 | 1.58913 | 61.13 |

TABLE 10B-continued

Example 4

| Sn | R | D | Nd | vd |
|---|---|---|---|---|
| 48 | −130.5795 | 6.9138 | | |
| 49 | 25.2060 | 7.8524 | 1.80610 | 33.27 |
| 50 | 49.6192 | 1.0626 | | |
| 51 | 557.5986 | 3.0000 | 1.69895 | 30.13 |
| 52 | 11.7201 | 4.6807 | | |
| 53(St) | ∞ | 2.6807 | | |
| 54 | −21.7843 | 3.0109 | 1.49700 | 81.54 |
| 55 | −9.8082 | 1.9332 | 1.75520 | 27.51 |
| 56 | −17.4515 | 5.0898 | | |
| 57 | 332.8753 | 1.8851 | 1.59551 | 39.24 |
| 58 | 32.9615 | 9.6900 | 1.49700 | 81.54 |
| 59 | −19.4105 | 14.9786 | | |
| 60 | 60.8421 | 5.3043 | 1.80518 | 25.42 |
| 61 | −241.8781 | 13.0006 | | |
| 62 | ∞ | 26.5000 | 1.51633 | 64.14 |
| 63 | ∞ | 0.0393 | | |

TABLE 11

Example 4

| | |
|---|---|
| \|f\| | 4.99 |
| FNo. | 2.40 |
| 2ω(°) | 137.0 |

TABLE 12

Example 4

| Sn | 1 | 2 |
|---|---|---|
| KA | −9.257099336489E−01 | −4.999990881777E+00 |
| A3 | 1.985136918204E−03 | 2.385259309972E−03 |
| A4 | −9.578192696406E−05 | −2.404768263625E−04 |
| A5 | 1.615430177955E−06 | 1.733287951793E−05 |
| A6 | 3.124939881493E−07 | −2.842529868774E−07 |
| A7 | −2.887647319497E−08 | −4.385675485220E−08 |
| A8 | 5.107902220288E−10 | 1.383172920372E−09 |
| A9 | 4.632774338826E−11 | 1.499498500746E−10 |
| A10 | −2.209061867475E−12 | −8.812217716797E−12 |
| A11 | −1.345795100928E−14 | −9.830322949355E−14 |
| A12 | 2.683547704222E−15 | 1.723698034612E−14 |
| A13 | −3.099849783220E−17 | −1.977208609514E−16 |
| A14 | −1.450454609593E−18 | −1.495435830036E−17 |
| A15 | 3.409823417801E−20 | 3.787207224236E−19 |
| A16 | 2.756947013206E−22 | 4.931843191971E−21 |
| A17 | −1.364363093674E−23 | −2.437393418552E−22 |
| A18 | 4.129821538406E−26 | 6.670674082221E−25 |
| A19 | 1.989627169765E−27 | 5.565234378128E−26 |
| A20 | −1.679492947259E−29 | −5.576486086969E−28 |

| Sn | 23 | 24 |
|---|---|---|
| KA | −1.598772035783E+00 | −4.999992219558E+00 |
| A3 | 0.000000000000E+00 | 0.000000000000E+00 |
| A4 | 4.123953593132E−05 | 3.966469406399E−05 |
| A5 | 2.150026343229E−06 | 1.722377142344E−06 |
| A6 | −2.897355240011E−07 | −2.323836721419E−07 |
| A7 | −9.942402280972E−09 | −6.268137348279E−10 |
| A8 | 3.842042238064E−09 | 1.951943307926E−09 |
| A9 | −1.506297631693E−10 | −5.030379238303E−11 |
| A10 | −1.509011702469E−11 | −9.515825735045E−12 |
| A11 | 1.056541347725E−12 | 2.763491459111E−13 |
| A12 | 2.270120616023E−14 | 2.916285110467E−14 |
| A13 | −2.885638796700E−15 | −8.294096726983E−16 |
| A14 | 1.623687403355E−18 | −5.208265921899E−17 |
| A15 | 3.929917370535E−18 | 1.361275593330E−18 |
| A16 | −4.193482420055E−20 | 5.227627291260E−20 |
| A17 | −2.647759191289E−21 | −1.112433404036E−21 |
| A18 | 4.302554608484E−23 | −2.750189344529E−23 |

TABLE 12-continued

Example 4

| A19 | 7.038183986554E−25 | 3.533591422182E−25 |
| A20 | −1.384413304729E−26 | 5.954593142748E−27 |

Figure 18:
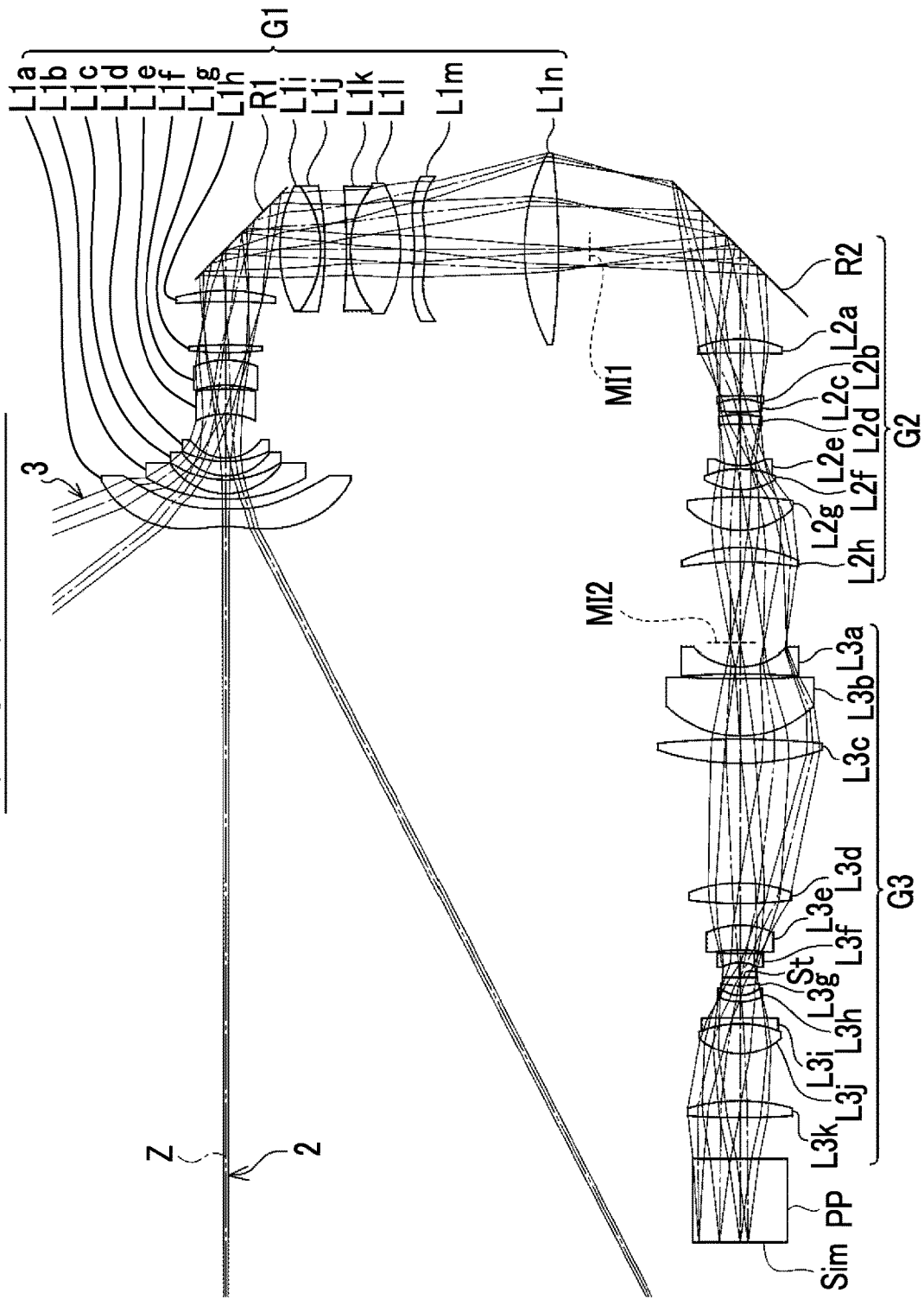
FIG. 18 is a cross-sectional view showing a configuration and rays of an imaging optical system according to Modification Example 4-1 of Example 4 of the present disclosure.

FIG. 18 shows an example, in which the optical path is deflected, as a modification example of Example 4. The imaging optical system of Modification Example 4-1 shown in FIG. 18 is configured such that two optical path deflecting members are added to the imaging optical system of Example 4 so as to deflect the optical path twice. In the imaging optical system of Modification 4-1, a first optical path deflecting member R1, which deflects the optical path by 90 degrees, is disposed inside the first optical system G1, and a second optical path deflecting member R2, which deflects the optical path by 90 degrees, is disposed to be closest to the magnification side in the second optical system G2.

Table 13 shows corresponding values of Conditional Expressions (1) to (11) of the imaging optical systems of Examples 1 to 4, and Table 14 shows numerical values relating to the conditional expressions. Examples 1 to 4 use the d line as a reference wavelength, and Tables 13 and 14 show values based on the d line.

TABLE 13

| Expression Number | | Example 1 | Example 2 | Example 3 | Example 4 |
|---|---|---|---|---|---|
| (1) | $|f1/f|$ | 2.43 | 2.29 | 1.81 | 2.08 |
| (2) | $|f12/f|$ | 1.70 | 1.21 | 1.56 | 1.15 |
| (3) | $|Bf/f|$ | 6.95 | 7.04 | 6.51 | 6.11 |
| (4) | $|Ymax/f|$ | 2.27 | 2.27 | 2.60 | 2.60 |
| (5) | $\theta$ | −8.87 | −7.32 | 9.56 | 12.44 |
| (6) | hdA | 0.813 | 0.394 | 0.125 | 0.215 |
| (7) | hdB | 0.162 | 0.132 | 0.166 | 0.047 |
| (8) | $(TL \times Ymax)/(|h| \times |f|)$ | 40.7 | 39.3 | 46.4 | 38.5 |
| (9) | $(f1 \times Ymax^2)/(|h| \times f^2)$ | 2.68 | 2.44 | 1.71 | 1.98 |
| (10) | $|h1/dd1|$ | 0.162 | 0.132 | 0.166 | 0.215 |
| (11) | $|h2/dd2|$ | 0.813 | 0.394 | 0.125 | 0.047 |

TABLE 14

| | Example 1 | Example 2 | Example 3 | Example 4 |
|---|---|---|---|---|
| f1 | 27.482 | 20.770 | 9.008 | 10.367 |
| f12 | −19.202 | −10.996 | −7.801 | −5.718 |
| Bf | 78.670 | 63.740 | 32.471 | 30.482 |
| Ymax | 25.70 | 20.56 | 13.00 | 13.00 |
| h | 52.98 | 43.91 | 35.81 | 35.62 |

As can be seen from the above data, the imaging optical systems of Examples 1 to 4 each have a small F-number of 2.4 or less and ensures a wide image angle of 130 degrees or more in all angles of view while keeping the lens diameter small. Each aberration is satisfactorily corrected, thereby realizing high optical performance. Further, the imaging optical systems of Examples 1 to 4 each are able to use rays in the entire area of the image circle including the vicinity of the optical axis, and each are configured to be telecentric on the reduction side.

Figure 19:
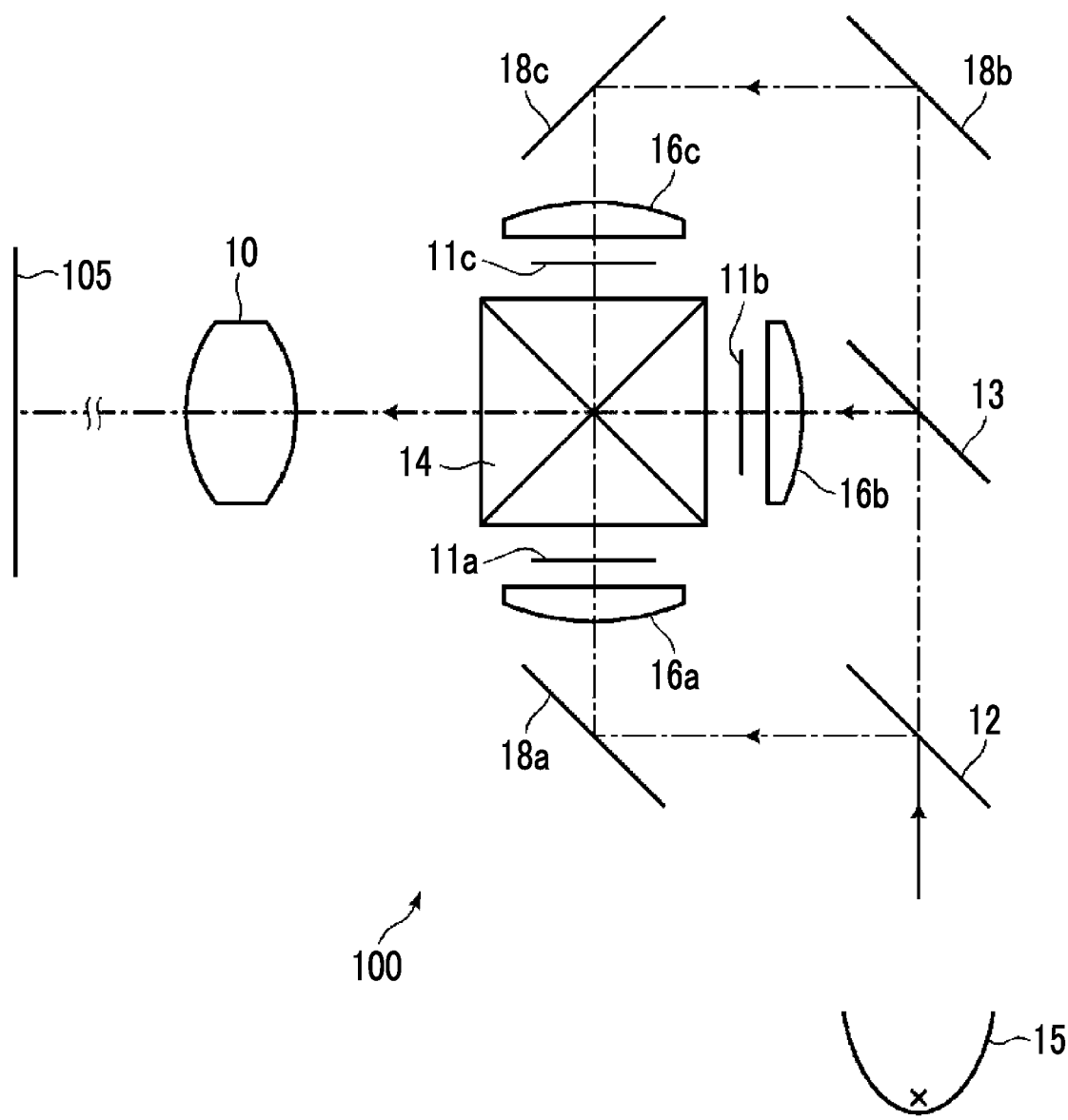
FIG. 19 is a schematic configuration diagram of a projection type display device according to an embodiment of the present disclosure.

Next, a projection type display device according to an embodiment of the present disclosure will be described. FIG. 19 is a schematic configuration diagram of a projection type display device according to an embodiment of the present disclosure. The projection type display device 100 shown in FIG. 19 has the imaging optical system 10 according to the embodiment of the present disclosure, a light source 15, transmissive display elements 11a to 11c as light valves each corresponding to each color light, dichroic mirrors 12 and 13 for color separation, a cross dichroic prism 14 for color synthesis, condenser lenses 16a to 16c, and total reflection mirrors 18a to 18c that deflect the optical path. In addition, FIG. 19 schematically shows the imaging optical system 10. Further, an integrator is disposed between the light source 15 and the dichroic mirror 12, but is not shown in FIG. 19.

White light originating from the light source 15 is separated into rays with three colors (green light, blue light, and red light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the light modulated through the transmissive display elements 11a to 11c, onto a screen 105.

Figure 20:
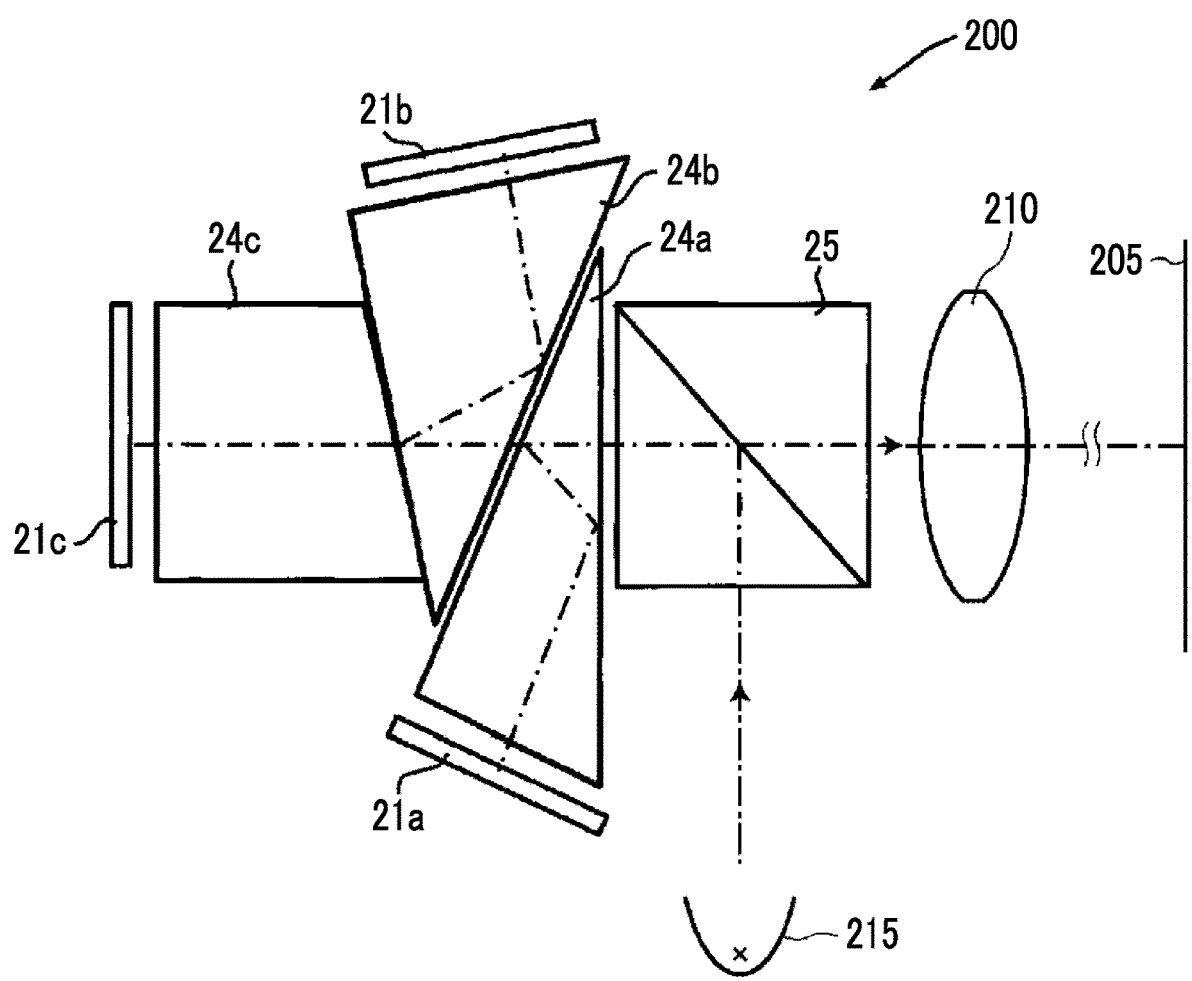
FIG. 20 is a schematic configuration diagram of a projection type display device according to another embodiment of the present disclosure.

FIG. 20 is a schematic configuration diagram of a projection type display device according to another embodiment of the present disclosure. The projection type display device 200 shown in FIG. 20 has a imaging optical system 210 according to the embodiment of the present disclosure, a light source 215, DMD elements 21a to 21c as light valves corresponding to respective color rays, total internal reflection (TIR) prisms 24a to 24c for color separation and color synthesis, and a polarization separating prism 25 that separates illumination light and projection light. In addition, FIG. 20 schematically shows the imaging optical system 210. Further, an integrator is disposed between the light source 215 and the polarization separating prism 25, but is not shown in FIG. 20.

White light originating from the light source 215 is reflected on a reflective surface inside the polarization separating prism 25, and is separated into rays with three colors (green light, blue light, and red light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the light modulated through the DMD elements 21a to 21c, onto a screen 205.

Figure 21:
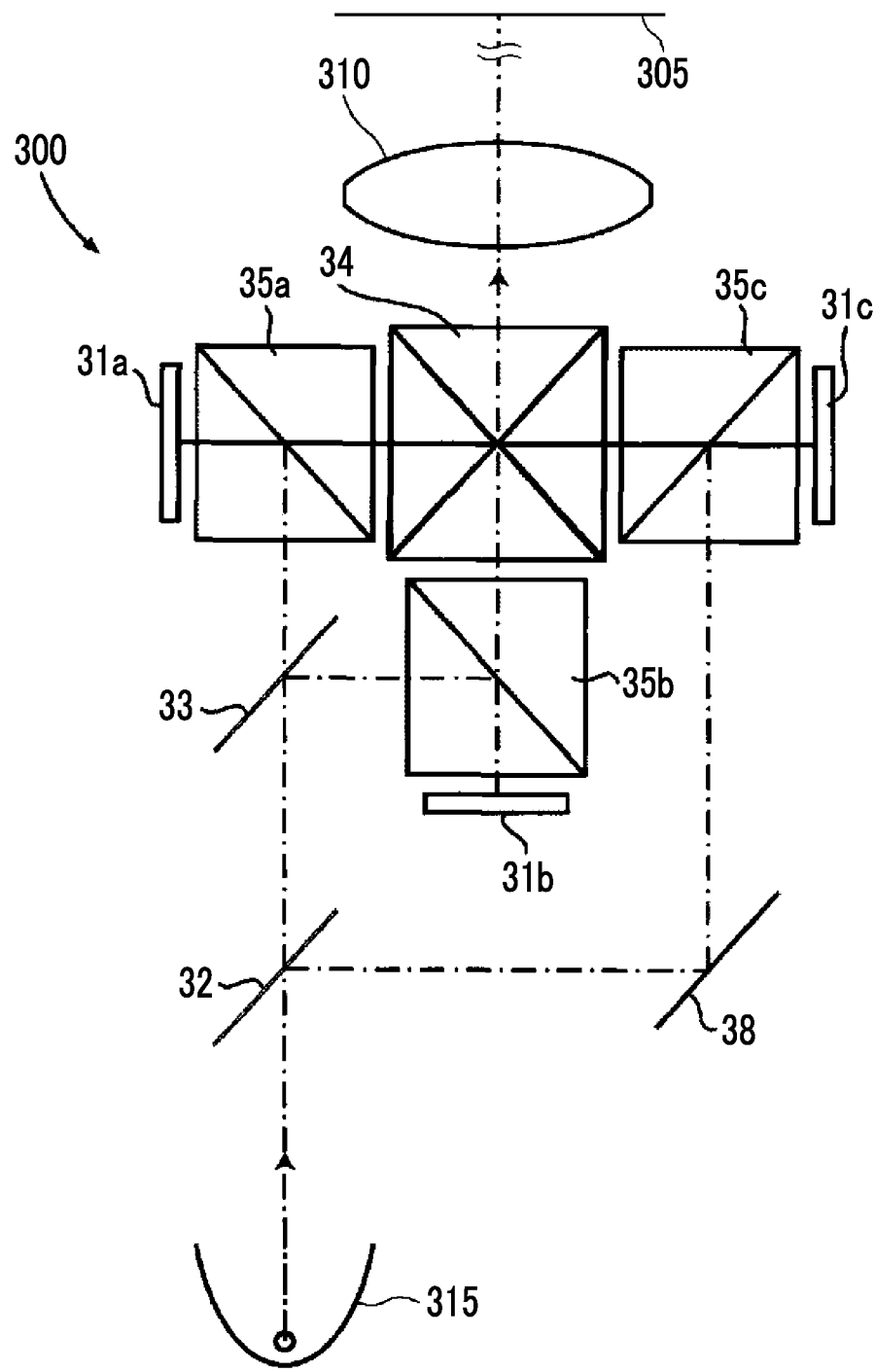
FIG. 21 is a schematic configuration diagram of a projection type display device according to still another embodiment of the present disclosure.

FIG. 21 is a schematic configuration diagram of a projection type display device according to still another embodiment of the present disclosure. The projection type display device 300 shown in FIG. 21 has an imaging optical system 310 according to the embodiment of the present disclosure, a light source 315, reflective display elements 31a to 31c as light valves each corresponding to each color light, dichroic mirrors 32 and 33 for color separation, a cross dichroic prism 34 for color synthesis, a total reflection mirror 38 for deflecting the optical path, and polarization separating prisms 35a to 35c. In addition, FIG. 21 schematically shows the imaging optical system 310. Further, an integrator is disposed between the light source 315 and the dichroic mirror 32, but is not shown in FIG. 21.

White light originating from the light source 315 is separated into rays with three colors (green light, blue light, and red light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the light modulated through the reflective display elements 31a to 31c, onto a screen 305.

Figure 22:
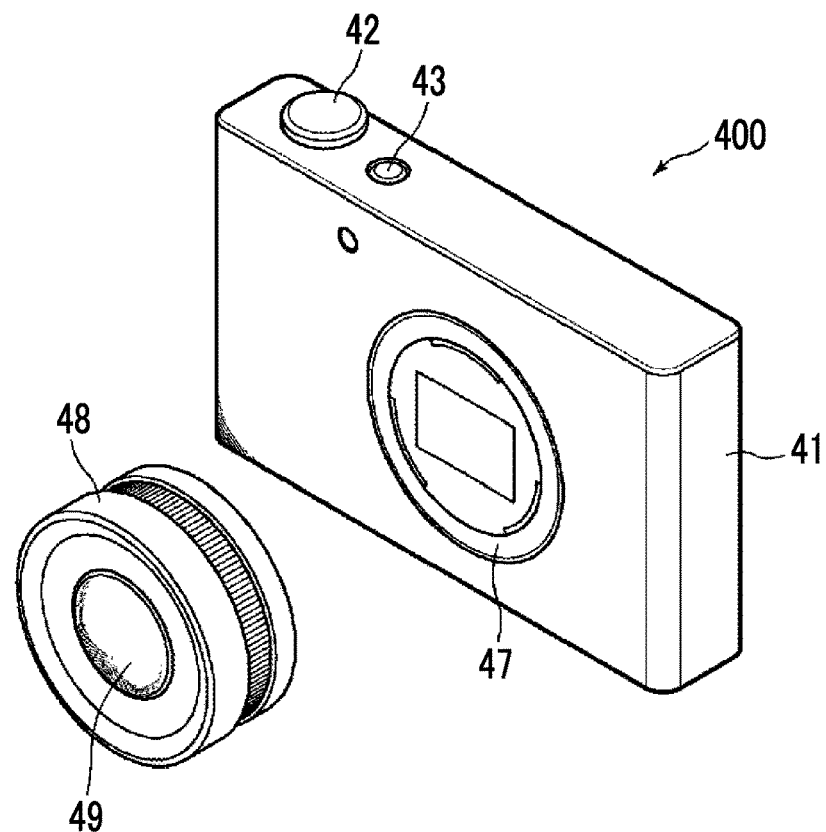
FIG. 22 is a front perspective view of the imaging apparatus according to the embodiment of the present disclosure.
Figure 23:
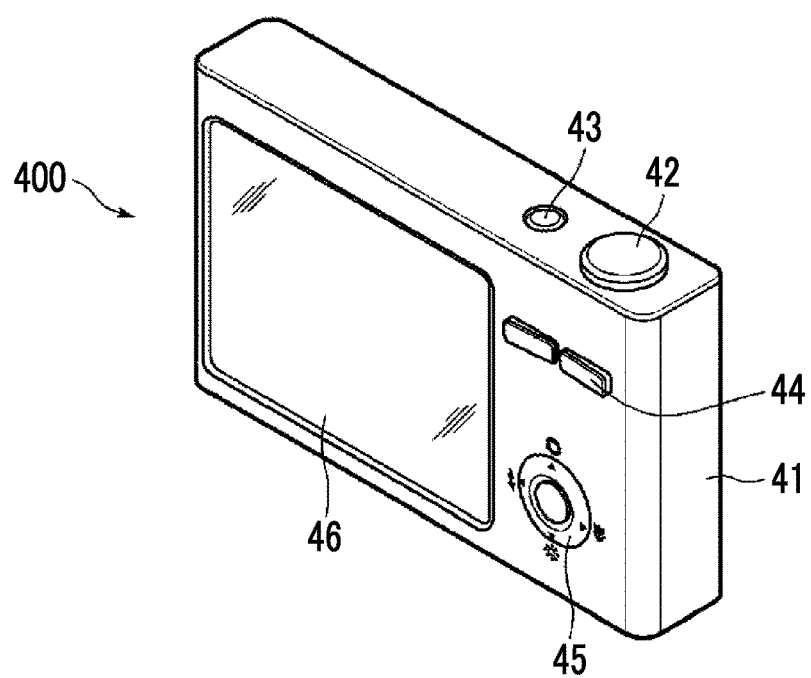
FIG. 23 is a rear perspective view of the imaging apparatus shown in FIG. 22.

FIGS. 22 and 23 are external views of a camera 400 which is the imaging apparatus according to the embodiment of the present disclosure. FIG. 22 is a perspective view of the camera 400 viewed from the front side, and FIG. 23 is a perspective view of the camera 400 viewed from the rear side. The camera 400 is a single-lens digital camera on which an interchangeable lens 48 is attachably and detachably mounted and which has no reflex finder. The interchangeable lens 48 is configured such that an imaging optical system 49 as the optical system according to the embodiment of the present disclosure is housed in a lens barrel.

The camera 400 comprises a camera body 41, and a shutter button 42 and a power button 43 are provided on an upper surface of the camera body 41. Further, operation units 44 and 45 and a display section 46 are provided on a rear surface of the camera body 41. The display section 46 displays a picked-up image or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a recording medium, and the like. The imaging element (not shown in the drawing) such as a charge coupled device (CCD) or a complementary metal oxide semiconductor (CMOS) outputs a picked-up image signal based on a subject image which is formed through the interchangeable lens 48. The signal processing circuit (not shown in the drawing) generates an image through processing of the picked-up image signal which is output from the imaging element. The recording medium (not shown in the drawing) records the generated image. The camera 400 captures a static image or a moving image by pressing the shutter button 42, and records image data, which is obtained through imaging, in the recording medium.

The present disclosure has been hitherto described through embodiments and examples, but the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

In addition, the projection type display device according to the technology of the present disclosure is not limited to the above configuration, and may be modified into various forms such as the optical member used for ray separation or ray synthesis and the light valve. The light valve is not limited to a form in which light from a light source is spatially modulated through an image display element and is output as an optical image based on image data, but may be a form in which light itself output from the self-luminous image display element is output as an optical image based on the image data. Examples of the self-luminous image display element include an image display element in which light emitting elements such as light emitting diodes (LED) or organic light emitting diodes (OLED) are two-dimensionally arranged.

Further, the imaging apparatus according to the technology of the present disclosure is not limited to the above configuration, and may be modified into various forms such as a camera other than a non-reflex system, a film camera, a video camera, and a camera for movie imaging.

What is claimed is:

1. An imaging optical system in which a magnification side imaging surface and a reduction side imaging surface are conjugate,
   wherein the imaging optical system forms a first intermediate image at a position conjugate to the magnification side imaging surface and a second intermediate image at a position closer to a reduction side than the first intermediate image on an optical path and conjugate to the first intermediate image,
   wherein the imaging optical system consists of a first optical system, a second optical system, and a third optical system in order from a magnification side to the reduction side along the optical path,
   wherein magnification side surfaces of all lenses of the first optical system are located on the optical path to be closer to the magnification side than the first intermediate image,
   wherein magnification side surfaces of all lenses of the second optical system are located on the optical path to be closer to the reduction side than the first intermediate image and to be closer to the magnification side than the second intermediate image,
   wherein magnification side surfaces of all lenses of the third optical system are located on the optical path to be closer to the reduction side than the second intermediate image, and
   wherein the imaging optical system does not include a reflective member having a power.

2. The imaging optical system according to claim 1, wherein assuming that
   a focal length of the first optical system is f1,
   a combined focal length of the first optical system and the second optical system is f12, and
   a focal length of the imaging optical system is f,
   Conditional Expressions (1) and (2) are satisfied, which are represented by $$1 < |f1/f| < 5 \tag{1}$$

and $$0.8 < |f12/f| < 3 \tag{2}.$$

3. The imaging optical system according to claim 1, wherein assuming that
   a back focal length of the imaging optical system on the reduction side is Bf, and
   a focal length of the imaging optical system is f,
   Conditional Expression (3) is satisfied, which is represented by $$5 < |Bf/f| \tag{3}.$$

4. The imaging optical system according to claim 1, wherein assuming that a maximum image height on the reduction side imaging surface is Ymax, and a focal length of the imaging optical system is f, Conditional Expression (4) is satisfied, which is represented by $$1.9<|Y\max/f| \tag{4}$$

5. The imaging optical system according to claim 4, wherein in a case where a maximum image height on the reduction side imaging surface is Ymax and a ray is incident from the reduction side imaging surface to the imaging optical system at a height of Ymax from an optical axis in parallel with the optical axis, assuming that an air gap in which the first intermediate image is located is a first air gap in a case where the first intermediate image is located inside the air gap, and an air gap which is adjacent to the magnification side of a lens in which the first intermediate image is located is the first air gap in a case where the first intermediate image is located inside the lens, an angle formed between a first extension line obtained by extending the ray in the first air gap and the optical axis is θ, and a sign of θ is negative in a case where the first intersection point, which is an intersection point between a first extension line and the optical axis, is located to be closer to the magnification side than the first intermediate image, and the sign of θ is positive in a case where the first intersection point is located to be closer to the reduction side than the first intermediate image, where a unit of θ is degrees, Conditional Expression (5) is satisfied, which is represented by $$-15<\theta<15 \tag{5}$$

6. The imaging optical system according to claim 1, wherein in a case where a maximum image height on the reduction side imaging surface is Ymax and a ray is incident from the reduction side imaging surface to the imaging optical system at a height of Ymax from an optical axis in parallel with the optical axis, assuming that a height of the ray from the optical axis on a lens surface closest to the magnification side in the second optical system is h1, an air gap in which the first intermediate image is located is a first air gap in a case where the first intermediate image is located inside the air gap, and an air gap which is adjacent to the magnification side of a lens in which the first intermediate image is located is the first air gap in a case where the first intermediate image is located inside the lens, an intersection point between a first extension line obtained by extending the ray in the first air gap and the optical axis is a first intersection point, a distance on the optical axis between the first intersection point and the lens surface closest to the magnification side in the second optical system is dd1, a height of the ray from the optical axis on a lens surface closest to the magnification side in the third optical system is h2, an air gap in which the second intermediate image is located is a second air gap in a case where the second intermediate image is located inside the air gap, and an air gap which is adjacent to the magnification side of a lens in which the second intermediate image is located is the second air gap in a case where the second intermediate image is located inside the lens, an intersection point between a second extension line obtained by extending the ray in the second air gap and the optical axis is a second intersection point, a distance on the optical axis between the second intersection point and the lens surface closest to the magnification side in the third optical system is dd2, and a larger value of |h1/dd1| and |h2/dd2| is hdA and a smaller value of |h1/dd1| and |h2/dd2| is hdB, Conditional Expressions (6) and (7) are satisfied, which are represented by $$0.1<hdA<1 \tag{6), and}$$

$$0.03<hdB<0.3 \tag{7}$$

7. The imaging optical system according to claim 1, wherein in the imaging optical system, an absolute value of a height of a principal ray having a maximum angle of view from an optical axis is the maximum on a lens surface closest to the magnification side in the first optical system, wherein assuming that a distance on the optical axis from the lens surface closest to the magnification side in the imaging optical system to a lens surface closest to the reduction side in the imaging optical system is TL, a maximum image height on the reduction side imaging surface is Ymax, a height of the principal ray with the maximum angle of view from the optical axis on the lens surface closest to the magnification side in the first optical system is h, and a focal length of the imaging optical system is f, Conditional Expression (8) is satisfied, which is represented by $$20<(TL\times Y\max)/(|h|\times|f|)<60 \tag{8}$$

8. The imaging optical system according to claim 1, wherein assuming that a focal length of the first optical system is f1, a maximum image height on the reduction side imaging surface is Ymax, a height of the principal ray with the maximum angle of view from the optical axis on the lens surface closest to the magnification side in the first optical system is h, and a focal length of the imaging optical system is f, Conditional Expression (9) is satisfied, which is represented by $$1.2<(f1\times Y\max^2)/(|h|\times f^2)<4 \tag{9}$$

9. The imaging optical system according to claim 1, wherein all optical elements included in the imaging optical system have a common optical axis.

10. The imaging optical system according to claim 1, further comprising two or more optical path deflecting members that deflect the optical path.

11. The imaging optical system according to claim 2, wherein Conditional Expression (1-1) is satisfied, which is represented by $$1.5<|f1/f|<3 \tag{1-1}$$

12. The imaging optical system according to claim 2, wherein Conditional Expression (2-1) is satisfied, which is represented by $$1<|f12/f|<2 \qquad (2\text{-}1).$$

13. The imaging optical system according to claim 3, wherein Conditional Expression (3-1) is satisfied, which is represented by $$6<|Bf/f|<20 \qquad (3\text{-}1).$$

14. The imaging optical system according to claim 4, wherein Conditional Expression (4-1) is satisfied, which is represented by $$2.1<|Y\max/f|<3.2 \qquad (4\text{-}1).$$

15. The imaging optical system according to claim 5, wherein Conditional Expression (5-1) is satisfied, which is represented by $$-13<\theta<13 \qquad (5\text{-}1).$$

16. The imaging optical system according to claim 7, wherein Conditional Expression (8-1) is satisfied, which is represented by $$30<(TL\times Y\max)/(|h|\times|f|)<50 \qquad (8\text{-}1).$$

17. The imaging optical system according to claim 8, wherein Conditional Expression (9-1) is satisfied, which is represented by $$1.5<(f1\times Y\max^2)/(|h|\times f^2)<3 \qquad (9\text{-}1).$$

18. A projection type display device comprising:
a light valve that outputs an optical image; and
the imaging optical system according to claim 1,
wherein the imaging optical system projects the optical image, which is output from the light valve, on a screen.

19. An imaging apparatus comprising the imaging optical system according to claim 1.

* * * * *